(12) United States Patent
Sakaguchi et al.

(10) Patent No.: US 12,448,492 B2
(45) Date of Patent: *Oct. 21, 2025

(54) ORGANIC POLYMER AEROGELS COMPRISING MICROSTRUCTURES

(71) Applicant: BLUESHIFT MATERIALS, INC., Spencer, MA (US)

(72) Inventors: Alan Sakaguchi, Spencer, MA (US); David Irvin, Spencer, MA (US); Alysa Joaquin, Spencer, MA (US)

(73) Assignee: BLUESHIFT MATERIALS, INC., Spencer, MA (US)

( * ) Notice: Subject to any disclaimer, the term of this patent is extended or adjusted under 35 U.S.C. 154(b) by 172 days.

This patent is subject to a terminal disclaimer.

(21) Appl. No.: 18/377,914

(22) Filed: Oct. 9, 2023

(65) Prior Publication Data
US 2024/0218141 A1 Jul. 4, 2024

Related U.S. Application Data

(63) Continuation of application No. 17/518,246, filed on Nov. 3, 2021, now Pat. No. 11,814,497, which is a
(Continued)

(51) Int. Cl.
C08J 9/28 (2006.01)
C08J 5/04 (2006.01)
(Continued)

(52) U.S. Cl.
CPC ............. *C08J 9/0061* (2013.01); *C08J 5/043* (2013.01); *C08J 5/046* (2013.01); *C08J 9/0085* (2013.01);
(Continued)

(58) Field of Classification Search
CPC .. C08J 9/0085; C08J 2205/048; C08J 9/0061; C08J 5/043; C08J 5/046; C08K 3/013
See application file for complete search history.

(56) References Cited

U.S. PATENT DOCUMENTS 5,705,535 A 1/1998 Jansen et al.
8,214,980 B2 7/2012 Bullock et al.
(Continued)

FOREIGN PATENT DOCUMENTS

CN 1592651 3/2005
CN 106163983 11/2016
(Continued)

OTHER PUBLICATIONS

Nguyen, B.N. et al. Polyimide Cellulose Nanocrystal Composite Aerogels. Macromolecules 2016, 49, 1692â1703 (Year: 2016).*
(Continued)

*Primary Examiner* — Christina H.W. Rosebach
(74) *Attorney, Agent, or Firm* — NORTON ROSE FULBRIGHT US LLP

(57) ABSTRACT

An organic polymer aerogel that includes an organic polymer gel matrix and microstructures dispersed or embedded within the aerogel is disclosed. The aerogel can have an at least bimodal pore size distribution comprising a first peak of less than or equal to 65 nm and a second peak greater than or equal to 100 nm.

23 Claims, 10 Drawing Sheets

Related U.S. Application Data continuation of application No. 16/480,998, filed as application No. PCT/US2018/015568 on Jan. 26, 2018, now Pat. No. 11,192,993.

(60) Provisional application No. 62/450,992, filed on Jan. 26, 2017.

(51) Int. Cl.
    *C08J 9/00*     (2006.01)
    *C08K 3/013*     (2018.01)

(52) U.S. Cl.
    CPC ............... *C08J 9/28* (2013.01); *C08K 3/013* (2018.01); *C08J 2205/024* (2013.01); *C08J 2205/026* (2013.01); *C08J 2205/028* (2013.01); *C08J 2205/048* (2013.01); *C08J 2205/05* (2013.01); *C08J 2379/08* (2013.01); *C08J 2427/18* (2013.01); *C08J 2467/00* (2013.01); *C08J 2477/10* (2013.01); *C08J 2479/08* (2013.01); *C08K 2201/001* (2013.01)

(56) References Cited

U.S. PATENT DOCUMENTS

| | | | |
|---|---|---|---|
| 8,637,582 | B2 | 1/2014 | Gawryla et al. |
| 9,434,832 | B1 | 9/2016 | Meador |
| 2002/0094426 | A1 | 7/2002 | Stepanian et al. |
| 2003/0212152 | A1 | 11/2003 | Ratke et al. |
| 2005/0064279 | A1* | 3/2005 | Struthers ............... C01B 3/0021 502/526 |
| 2010/0204347 | A1 | 8/2010 | Park et al. |
| 2014/0148560 | A1 | 5/2014 | Qureshi et al. |
| 2015/0017860 | A1 | 1/2015 | Bullock et al. |
| 2015/0141544 | A1 | 5/2015 | Meador et al. |
| 2017/0174576 | A1 | 6/2017 | Swoboda et al. |
| 2020/0071481 | A1* | 3/2020 | Yang ......................... C08J 5/24 |

FOREIGN PATENT DOCUMENTS

| | | |
|---|---|---|
| CN | 110114390 | 8/2019 |
| DE | 10300979 | 7/2004 |
| DE | 102004047552 | 4/2006 |
| DE | 102012218548 | 4/2014 |
| EP | 3053952 | 8/2016 |

OTHER PUBLICATIONS

Machine translation of DE 102012218548 by Ratke (Year: 2012).*
First Office Action issued for CN 201880021227.0, mailing date Sep. 15, 2021. (With English translation.).
International Search Report and Written Opinion issued in Corresponding International Patent Application No. PCT/US2018/015568, dated Apr. 24, 2018.
International Search Report and Written Opinion issued in International Patent Application No. PCT/IB2017/056575, dated Feb. 21, 2018.
Translation of DE 102012218548 by Ratke et al (Year: 2014).

* cited by examiner

ORGANIC POLYMER AEROGELS COMPRISING MICROSTRUCTURES

CROSS-REFERENCE TO RELATED APPLICATIONS

This application is a continuation of U.S. patent application Ser. No. 17/518,246 filed Nov. 3, 2021, which is a continuation of U.S. patent application Ser. No. 16/480,998 filed Jul. 25, 2019 (now U.S. Pat. No. 11,192,993), which is a 371 national-phase application of PCT/US2018/015568 filed Jan. 26, 2018, which claims benefit to U.S. Provisional Application 62/450,992 filed Jan. 26, 2017. The contents of the referenced applications are incorporated into the present application by reference.

BACKGROUND OF THE INVENTION

A. Field of the Invention

The present disclosure relates to the field of aerogels. In particular, the invention concerns an organic polymer aerogel having polymeric microstructures comprised within the aerogel.

B. Description of Related Art

An aerogel is a porous solid that is formed from a gel, in which the liquid that fills the pores of the gel has been replaced with a gas (e.g., air). Shrinkage of the gel's solid network during drying is negligible or altogether prevented due to the minimization of or resistance to the capillary forces acting on the network as the liquid is removed. In order to prevent shrinking during drying, however, time consuming, expensive, and/or complicated processes are typically used such as freeze-drying or super-critical drying (see U.S. Pat. No. 5,705,535). The dried aerogel network is typically comprised of inorganic particles (e.g., silica-based, titania-based, zirconia-based, alumina-based, hafnia-based, yttria-based, or ceria-based aerogels) or polymer particles (polymer-based aerogels) (see U.S. Patent Publication 2015/0017860). These aerogels are generally characterized as having high porosity (about 94-99%), single-mode pore size distribution, low density, and high specific surface area. High porosity confers a number of useful properties to aerogels, including high surface area, low refractive index, low dielectric constant, low thermal-loss coefficient, and low sound velocity.

However, conventional aerogels lack mechanical durability. The lack of durability can have a negative impact on production scale-up, large scale manufacturing, conformation to irregular surfaces, or maintaining integrity in dynamic conditions. Recent efforts to improve upon the durability of aerogels, while still maintaining good thermal and flexible properties, have been focused on internally reinforcing aerogels. For example, U.S. Patent Publication No. 2002/0094426 discloses reinforced aerogel blankets that use fibers in the form of a lofty batting to reinforce the aerogel. In other examples, U.S. Patent Publication 2015/0017860 and U.S. Pat. No. 8,214,980 each disclose the use of woven and non-woven fibrous materials to support aerogels. It is believed that these and other currently available fiber-reinforced aerogels have a single-mode pore size distribution in the solid aerogel network, which may influence the mechanical properties, causing the aerogels to become more brittle than desired, which can cause aerogel-fiber adhesion problems, dusting, and handling issues. Further, complicated drying processes (e.g., super-critical drying) are needed to prevent the aerogel network from cracking or collapsing.

Conventional aerogels also face a number of challenges during processing. Because of the highly porous nature of wet gels, they are prone to cracking, shrinkage, and embrittlement during the drying process and when subjected to thermal cycling.

There exists a need for aerogels with enhanced thermal and mechanical properties such as thermal conductivity, compressive strength, tensile strength, mechanical durability and toughness, wear resistance, flexibility, and low levels of expansion/contraction with temperature changes. In addition, there exists a need for aerogel compositions and manufacturing process conditions that are economical and avoid the cracking, shrinkage, and embrittlement that can occur during drying and thermal cycling.

SUMMARY OF THE INVENTION

A discovery has been made that provides a solution to the aforementioned problems associated with currently available aerogels. The discovery is premised on the creation of organic polymer aerogels with microstructures comprised within the aerogel. Without wishing to be bound by theory, it is thought that the microstructures decrease the average pore size in the aerogel, which enhances thermal and mechanical properties. The microstructures may include microfibers and microparticles that are many orders of magnitude larger than the polymer particles that make up the aerogel polymer matrix, which can help provide structural reinforcement to strengthen the aerogel polymer matrix both during and after manufacturing. In some embodiments, the microstructures also lead to a multi-modal pore size distribution (i.e., a pore size distribution having at least two modes of pore size) throughout the solid or dried aerogel network. In particular, the solid aerogel network can have at least two distinct populations of pore sizes, one with an average diameter smaller than 65 nanometers (nm), and one with an average diameter larger than 65 nm. In some instances, a trimodal pore size distribution can be created where the third pore size mode has an average diameter of greater than 1 micron (μm). Without wishing to be bound by theory, it is believed that the multi-modal pore size structure of the aerogel network is created by microstructures (e.g., aramid fibers, glass fibers, PTFE particles, and aerogel powder particles) that can cause different nucleation events of solubilized polymers during the formation of the gel network, which can result in polymer particles with a wider variety of sizes than would result without the microstructures. Once the liquid-phase is removed via drying, the resulting aerogel network has a multi-modal pore size distribution due to the different polymer particle sizes present in the solid aerogel network. Notably, the presence of varying pore sizes in the gel, as well as the structural strength provided by the microstructures themselves, can help prevent network collapse during drying, which allows the aerogels of the present invention to be produced by processes such as thermal drying or evaporative air drying in addition to the more commonly used freeze-drying and super-critical drying processes. The use of thermal and/or evaporative air drying provides for a more cost- and time-efficient process that can be scalable to meet large scale manufacturing needs. Even further, the presence of the multi-modal pore structure can help reduce the thermal conductivity of the aerogels of the present invention to less than or equal to 40 mW/m·K at a temperature of 20° C. or less than or equal to 30 mW/m·K at a temperature of 20° C. or less. The organic polymer aerogels disclosed herein have superior mechanical properties to conventional aerogels. The combination of the microstructure materials and the organic polymer aerogel matrices herein results in aerogels that are much stronger and less compressible than currently available reinforced aerogels, while maintaining good thermal properties.

Disclosed herein is an aerogel comprising an organic polymer matrix and microstructures comprised within the aerogel. In some embodiments, the microstructures are distributed throughout the aerogel. As used herein, a microstructure is "distributed throughout" the aerogel if the microstructure can be found in every substantial portion of the aerogel. Put another way, the microstructure is "distributed throughout" an aerogel if there is no substantial portion of the aerogel in which the microstructure cannot be found. As one non-limiting example, a microstructure is distributed throughout an aerogel if the microstructure can be found within every portion of the aerogel having a volume of at least 125 mm$^3$. In some embodiments, the aerogel comprises a plurality of layers, one or more of which do not comprise any microstructures. In some embodiments, the microstructures that are comprised within the aerogel comprise fibers or particles, including polymer fibers and polymer particles. In some embodiments, the microstructures comprise one or more of the following: aramid fibers, poly(tetrafluoroethylene) (PTFE) particles, and aerogel powder particles. In some embodiments, the aerogel does not comprise inorganic fibers or particles. In some embodiments, the aerogel does not comprise nanostructures dispersed within the aerogel. In some embodiments, the aerogel comprises inorganic fibers or particles, including glass fibers, glass spheres, carbon fibers, metal particles, metal fibers, and/or ceramic particles.

The fiber microstructures comprised within the aerogel can be of a variety of sizes. In some embodiments, the fibers have an average diameter between about 10 and 15 µm. In some embodiments, the fibers have an average diameter or an average thickness of at least about, at most about, or about 1, 5, 10, 15, 20, 25, 30, 35, 40, 45, 50, 55, 60, 65, 70, 75, 80, 85, 90, 95, or 100 µm, or between any two of these values. In some embodiments, the fibers have an average length between about 0.1 and 0.5 mm or between about 1.3 and 1.8 mm. In some embodiments, the fibers have an average length between about 0.1 and 2 mm. In some embodiments, the fibers have an average length of at least about, at most about, or about 0.15, 0.2, 0.25, 0.3, 0.35, 0.4, 0.45, 0.5, 0.6, 0.7, 0.8, 0.9, 1.0, 1.1, 1.2, 1.3, 1.4, 1.5, 1.6, 1.7, 1.8, 1.9, 2.0, 3.0, 4.0, 5.0, 6.0, 7.0, 8.0, 9.0, or 10.0 mm, or between any two of these values. In some embodiments, the fibers comprise two or more distinct groups of fibers. In some embodiments, a first group of fibers has an average length between about 0.1 and 0.5 mm and a second group of fibers has an average length of between about 1.3 and 1.8 mm. In some embodiments, a first group of fibers has an average length of about 0.3 mm and a second group of fibers has an average length of about 1.6 mm. In some embodiments, the average aspect ratio of the fibers is between about 15 and 150. In some embodiments, the average aspect ratio of the fibers is at least about, at most about, or about 15, 30, 60, 90, 120, or 150, or is between any two of those values. In some embodiments, the weight ratio of the first group of fibers to the second group of fibers is about 5:1, 4:1, 3:1, 2:1, or 1:1 or is between any two of those values. In some embodiments, the fibers comprise between about 1 and 90 wt % of the aerogel. In some embodiments, the fibers comprise at least about, at most about, or about 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, or 15, 20, 25, 30, 35, 40, 45, 50, 55, 60, 65, 70, 75, 80, 85, or 90 wt % of the aerogel, or between any two of those values. As used herein, the weight percentage of the fibers or other microstructures in the aerogel refers to the weight percentage in relation to the total weight of the entire aerogel, including the microstructures.

The particle microstructures comprised within the aerogel can also be of a variety of sizes. As used herein, a "particle" is distinguished from a "fiber" in that the former does not have a structure that is as highly elongated as the latter. A structure with an aspect ratio of less than 5 is referred to as a particle herein, while a structure with an aspect ratio of 5 or greater is referred to as a fiber. In some embodiments, the particle microstructures comprise PTFE particles, aerogel powder particles, or combinations thereof. In some embodiments, the primary particles have an average diameter or average size between about 0.2 and 20 µm. In some embodiments, the average diameter or average size of the primary particles is at least about, at most about, or about 0.2, 0.3, 0.4, 0.5, 0.6, 0.7, 0.8, 0.9, 1.0, 1.5, 2.0, 2.5, 3.0, 3.5, 4.0, 4.5, 5.0, 6, 7, 8, 9, 10, 11, 12, 13, 14, 15, 16, 17, 18, 19, or 20 µm or is between any two of those values. As used herein, "primary particles" refers to individual powder particles and does not include "secondary particles," which are an agglomeration of primary particles. In some embodiments, the particle microstructures comprise between about 1 and 90 wt % of the aerogel. In some embodiments, the fibers comprise at least about, at most about, or about 0.1, 0.2, 0.3, 0.4, 0.5, 0.6, 0.7, 0.8, 0.9, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, or 15, 20, 25, 30, 35, 40, 45, 50, 55, 60, 65, 70, 75, 80, 85, or 90 wt % of the aerogel or between any two of those values.

In some embodiments, the polymer microstructure dispersed or embedded within the aerogel comprises aerogel powder particles. An "aerogel powder," as used herein, refers to a powder that has been made by milling, crushing, or pulverizing a solid aerogel, or by otherwise deriving small particles from a solid aerogel.

In some embodiments, the polymer gel matrix in the aerogel comprises resorcinol formaldehyde, phenol formaldehyde, polyimide, polyamine, polyamide, poly(amide-imide), poly(amic amide), poly(ether imide), polyphenol, polyalcohol, polyvinyl butryal, polyurethane, polyurea, polycarbonate, polyester, polyether, polyacid, or any combination thereof. In some embodiments, the polymer gel matrix comprises or consists of resorcinol formaldehyde or polyimide.

In some embodiments, the aerogel has an at least bimodal pore size distribution with a first mode of pores having an average pore size of less than or equal to 65 nanometers (nm) and a second mode of pores having an average pore size of greater than 65 nm. In some embodiments, the aerogel has a first mode of pores with an average pore size from 3 nm to 65 nm and a second mode of pores with an average pore size from 65 nm to 10 µm. In some embodiments, the first mode of pores has a peak at about 1, 2, 3, 4, 5, 6, 7, 8, 9, 10, 11, 12, 13, 14, or 15 nm in a pore size distribution graph or between any two of these values. In some embodiments, a second mode of pores has a peak at about 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 550, 600, 650, 700, 750, 800, 850, 900, 950, 1000, 1050, 1100, 1150, 1200 nm in a pore size distribution graph or between any two of these values.

In some embodiments the aerogel has a pore size distribution with a first peak at about 1, 2, 3, 4, 5, 6, 7, 8, 9, 10, 11, 12, 13, 14, or 15 nm or between any two of these values and a second peak at about 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 550, 600, 650, 700, 750, 800, 850, 900, 950, 1000, 1050, 1100, 1150, 1200 nm or between any two of these values. In some embodiments, the aerogel has a first mode of pores with an average pore size less than or equal to 65 nm and a second mode of pores with an average pore size greater than or equal to 100 nm. In some embodiments, the aerogel has a trimodal pore size distribution. In some embodiments, a first mode of pores has an average pore size of 3 nm to 65 nm, a second mode of pores has an average pore size of 65 nm to 10 µm, and a third mode of pores has an average pore size of greater than 10 micron (µm). In some embodiments, the aerogel has a first mode of pores with an average pore size of less than or equal to 50 nm and a second mode of pores having an average pore size of greater than 50 nm. In some embodiments, the aerogel has a first mode of pores with an average pore size from 3 nm to 50 nm and a second mode of pores with an average pore size from 50 nm to 10 µm. In some embodiments, a pore size distribution of the aerogel shows one population of pores having an average diameter smaller than 50 nm and one having an average diameter larger than 100 nm. In some embodiments, a first mode of pores has an average pore size of 3 nm to 50 nm, a second mode of pores has an average pore size of 50 nm to 10 µm, and a third mode of pores has an average pore size of greater than 10 µm. In some embodiments, the pore size distribution has at least one peak above 50 nm and at least one peak below 50 nm, at least one peak above 65 nm and at least one peak below 65 nm, at least one peak above 100 nm and at least one peak below 65 nm, or at least one peak above 100 nm and at least one peak below 50 nm. In some embodiments, at least 10, 15, 20, 25, 30, 35, 40, 45, or 50% of the pores in the aerogel are above 50, 65, or 100 nm in diameter and at least 10, 15, 20, 25, 30, 35, 40, 45, or 50% of the pores in the aerogel are below 50, 65, or 100 nm in diameter. In some embodiments, the aerogels disclosed herein have pore size distributions showing multiple peaks having a substantial difference in their sizes as compared to one another. For example, in some embodiments, an aerogel has at least two peaks that are separated from one another by at least about 50 nm. In some embodiments, the peaks are separated by from one another by at least about 10, 15, 20, 25, 30, 35, 40, 45, 50, 55, 60, 65, 70, 75, 80, 85, 90, 95, 100, 125, 150, 175, 200, 225, 250, 275, 300, 325, 350, 375, or 400 nm, or between any two of these values. In some embodiments, the average size of pores in the aerogel is between about 5 and 25 nm. In some embodiments, the average size of pores in the aerogel is between about 3 and 25 nm. In some embodiments, the average pore size of the aerogel as measured by gas adsorption is at least about, at most about, or about 3, 4, 5, 6, 7, 8, 9, 10, 11, 12, 13, 14, 15, 16, 17, 18, 19, 20, 21, 22, 23, 24, 25, 30, 35, 40, 45, 50, 55, 60, 65, 70, 75, 80, 85, 90, 95, 100, 125, 150, 175, 200, 225, 250, 275, 300, 325, 350, 375, 400, 425, 450, 475, 500, 600, 700, 800, 900, 1000, 1100, 1200, or 1300 nm or is between any two of these values. In some embodiments, the aerogel has a pore size distribution in which the difference in size between the highest-diameter peak and the lowest-diameter peak is at least about 50 nm, 75 nm, 100 nm, 125 nm, 150 nm, 200 nm, 225 nm, 250 nm, 275 nm, 300 nm, 325 nm, 350 nm, 375 nm, 400 nm, 425 nm, 450 nm, 475 nm, or 500 nm or is between any two of those values. In some embodiments, the aerogel has a pore size distribution that satisfies at least 1, 2, 3, or 4 of the above criteria. For example, in some embodiments, the aerogel has a pore size distribution in which (1) the distribution is multimodal; (2) the distribution has a first peak at about 1, 2, 3, 4, 5, 6, 7, 8, 9, 10, 11, 12, 13, 14, or 15 nm or between any two of these values; (3) the distribution has a second peak at about 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 550, 600, 650, 700, 750, 800, 850, 900, 950, 1000, 1050, 1100, 1150, 1200 nm or between any two of these values; and (4) the difference in size between the first peak and the second peak is at least about 50 nm, 75 nm, 100 nm, 125 nm, 150 nm, 200 nm, 225 nm, 250 nm, 275 nm, 300 nm, 325 nm, 350 nm, 375 nm, or 400 nm or is between any two of those values.

In some embodiments, the aerogels described herein have a thermal conductivity less than or equal to 40 mW/m·K at temperatures below, up to, or at 150° C. In some embodiments, the aerogels described herein have a thermal conductivity less than or equal to 40 mW/m·K at temperatures below, up to, or at 150° C. In some embodiments the thermal conductivity is less than or equal to 40 mW/m·K at temperatures below, up to, or at 200° C. In some embodiments the thermal conductivity is less than or equal to 50 mW/m·K at temperatures below, up to, or at 200° C. In some embodiments, the thermal conductivity is about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 mW/m·K or is below any of these values or is between any of two these values at temperatures below, up to, or at 150° C. or below, up to, or at 200° C. In some embodiments, the thermal conductivity is about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 mW/m·K or is between any of these values at temperatures of −200, −150, −100, −50, −20, —10, 0, 10, 20, 30, 40, 50, 60, 70, 80, 90, 100, 110, 120, 130, 140, 150, 160, 170, 180, 190, or 200° C. or at temperatures below any of those values or between any two of those values.

In some embodiments, aerogels described herein have a density of less than 0.5 g/cm$^3$ or less than 0.25 g/cm$^3$ or from 0.1 g/cm$^3$ to 0.5 g/cm$^3$ or from 0.2 g/cm$^3$ to 0.25 g/cm$^3$. In some embodiments, the organic polymer aerogel has a density of at least about, at most about, or about 0.1, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, or 0.40 g/cm$^3$ or between any two of those values.

In some embodiments, the aerogels described herein have a pore volume of greater than 2 cm$^3$/g or of 2.0, 2.1, 2.2, 2.3, 2.4, 2.5, 2.6, 2.7, 2.8, 2.9, or 3.0 cm$^3$/g or between any two of those values.

In some embodiments, the aerogels described herein have a surface area of at least 150 m$^2$/g or of 50, 75, 100, 125, 150, 200, 210, 220, 230, 240, 250, 260, 270, 280, 290, or 300 m$^2$/g or between any two of those values.

In some embodiments, the aerogels described herein can have a substantially planar shape and have a thickness of 0.5 mm to 50 mm. In some embodiments, the thickness is 0.125 mm to 50 mm. In some embodiments, the thickness is approximately 0.125, 0.2, 0.3, 0.4, 0.5, 1, 2, 3, 4, 5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 60, 70, 80, 90, 100, 200, 300, 400, 500, 600, 700, 800, 900, or 1000 mm or between any two of those values.

In some embodiments, the aerogels described herein have a tensile strength of at least 2 MPa as measured in either the machine or cross direction. In some embodiments the tensile strength is at least about or about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, or 15 MPa or is between any two of those values as measured in the machine direction. In some embodiments the tensile strength is at least about or about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, or 15 MPa or is between any two of those values as measured in the cross direction. In some embodiments, the tensile strength is at least about or about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, or 15 MPa or is between any two of those values as measured in the machine or cross direction at a temperature of 23° C.

In some embodiments, the aerogels described herein have a compression strength at 10% strain of at least about 1.0 MPa. In some embodiments, the compression strength at 10% strain is at least about, at most about, or about 0.5, 0.6, 0.7, 0.8, 0.9, 1.0, 1.1, 1.2, 1.3, 1.4, 1.5, 1.6, 1.7, 1.8, 1.9 or 2.0 MPa, or is between any two of those values.

In some embodiments, the aerogels described herein have a flex fatigue of at least 50,000, 100,000, or 500,000 cycles to failure, or between any two of those values.

Also disclosed is an article of manufacture comprising any of aerogels described above. The article of manufacture may be a thin film, monolith, wafer, blanket, core composite material, substrate for radiofrequency antenna, substrate for a sunshield, substrate for a sunshade, substrate for radome, insulating material for oil and/or gas pipeline, insulating material for liquefied natural gas pipeline, insulating material for cryogenic fluid transfer pipeline, insulating material for apparel, insulating material for aerospace applications, insulating material for buildings, cars, and other human habitats, insulating material for automotive applications, insulation for radiators, insulation for ducting and ventilation, insulation for air conditioning, insulation for heating and refrigeration and mobile air conditioning units, insulation for coolers, insulation for packaging, insulation for consumer goods, vibration dampening, wire and cable insulation, insulation for medical devices, support for catalysts, support for drugs, pharmaceuticals, and/or drug delivery systems, aqueous filtration apparatus, oil-based filtration apparatus, and solvent-based filtration apparatus, or any combination thereof. In some embodiments, the article of manufacture is a blanket, which may have a thickness of 5 mm to 10 mm or of about 5, 6, 7, 8, 9, 10, 11, 12, 13, 14, 15, 16, 17, 18, 19, 20, 21, 22, 23, 24, 25, 50, 100, 500, 1000, 1500, 2000, or 3000 mm or between any two of those values.

Also disclosed is a method of making aerogels having the properties described above. The method can include: (a) dispersing microstructures in a liquid composition comprising a first solvent and one or more organic gel matrix precursors; (b) forming a gel from the liquid composition, wherein the one or more organic gel matrix precursors are comprised in a polymer gel matrix; and (c) drying the gel to form an aerogel having the microstructures dispersed within the aerogel. In some embodiments, the microstructures comprise one or more of the following: aramid fibers, glass fibers, polyester fibers, poly(tetrafluoroethylene) (PTFE) particles, and aerogel powder particles. In some embodiments, step (c) comprises supercritical drying, subcritical drying, thermal drying, freeze drying, evaporative air drying, vacuum drying, or any combination thereof. In some embodiments, the method of making an aerogel excludes one or more of these methods of drying a gel to make an aerogel. For example, in some embodiments, step (c) in the method described above does not comprise supercritical drying, subcritical drying, or freeze drying. It is a particular advantage of embodiments described herein that the aerogels can be formed using evaporative air drying, thermal drying, or vacuum drying as the only drying method in step (c).

In some embodiments, rather than dispersing microstructures in a liquid composition, step (a) may comprise saturating a scrim, cloth, or mat with the liquid composition comprising a first solvent and one or more organic gel matrix precursors, wherein the scrim, cloth, or mat comprises microstructures, such as microfibers. This results in microstructures from the scrim, cloth, or mat being embedded within the liquid composition and, after step (b), being embedded within the gel. Other methods of creating a gel with microstructures dispersed or embedded therein may also be used. In some embodiments, the microstructures end up distributed throughout the gel formed in step (b) and the aerogel formed in step (c) even though the microstructures were not stirred into or otherwise dispersed into the liquid composition. In some embodiments, the scrim, cloth, or mat comprises one or more of the following microstructures: aramid fibers, glass fibers, polyester fibers, cellulose fibers, protein fibers, PTFE particles, or aerogel powder particles. Cellulose fibers may include plant-derived materials such as cotton fibers and wood pulp fibers. Protein fibers may include animal-derived materials such as wool fibers and silk fibers.

The formation of the gel in step (b) can result in the formation of polymer particles from polymers and/or polymer precursors (which may include monomers that can be polymerized) that are solubilized or dispersed in the liquid composition. The polymers and polymer precursors that are present in the liquid composition of step (a) and that form a polymer gel matrix during step (b) are referred to herein as "organic gel matrix precursors." The polymer particles in the gel can have varying particle sizes (e.g., at least two, three, four, or more different sizes), which can result in a gelled network comprised of different particle sizes. In some embodiments, removal of the liquid phase from the gelled network during drying step (c) results in a network of polymer particles with varying sizes with gas (e.g., air) present where the liquid used to be. These different particle sizes can produce an aerogel network having a multi-modal (e.g., bimodal or trimodal) pore size distribution, with the microstructures present within this polymer particle network. The different particle sizes can also produce an aerogel network having low average pore sizes. In some embodiments, the one or more organic gel matrix precursors in the liquid composition of step (a) comprise polyamic acid, 2-methylimidazole, and benzoic anhydride.

In some embodiments, a solvent exchange step takes place after the gel is formed in step (b) and before it is dried to form an aerogel in step (c). In some embodiments, the first solvent is replaced with a second solvent having a higher volatility than the first solvent. In some embodiments, the second solvent is then exchanged with a third solvent that has an even higher volatility or is otherwise more suitable for the drying step. In some embodiments, the second solvent is acetone. In some embodiments, the third solvent is tert-butyl alcohol (TBA). In some embodiments, only one solvent exchange step is performed; that is, the only solvent exchange method performed is replacing the first solvent with a second solvent. In some embodiments, a solvent exchange step in which acetone replaces the first solvent is the only solvent exchange step performed. In some embodiments, the method does not include a solvent exchange in which TBA is used.

In some embodiments, the weight ratio of the microstructures to the one or more organic gel matrix precursors in the liquid composition of step (a) is between about 1:500 and 1:1. In some embodiments, the weight ratio is about 1:500, 1:450, 1:400, 1:350, 1:300, 1:250, 1:200, 1:150, 1:100, 1:50, 1:40, 1:30, 1:20, 1:15, 1:10, 1:5, 1:4, 1:3, 1:2, or 1:1, or is between any two of these values.

Fiber microstructures dispersed or embedded within the liquid composition in step (a) can be of a variety of sizes. In some embodiments, the fibers have an average diameter between about 10 and 15 µm. In some embodiments, the fibers have an average diameter or an average thickness of at least about, at most about, or about 1, 5, 10, 15, 20, 25, 30, 35, 40, 45, 50, 55, 60, 65, 70, 75, 80, 85, 90, 95, or 100 µm, or between any two of these values. In some embodiments, the fibers have an average length between about 0.1 and 0.5 mm or between about 1.3 and 1.8 mm. In some embodiments, the fibers have an average length between about 0.1 and 2 mm. In some embodiments, the fibers have an average length of at least about, at most about, or about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 mm, or between any two of these values. In some embodiments, the fibers comprise two or more distinct groups of fibers. In some embodiments, a first group of fibers has an average length between about 0.1 and 0.5 mm and a second group of fibers has an average length of between about 1.3 and 1.8 mm. In some embodiments, a first group of fibers has an average length of about 0.3 mm and a second group of fibers has an average length of about 1.6 mm. In some embodiments, the average aspect ratio of the fibers is between about 15 and 150. In some embodiments, the average aspect ratio of the fibers is at least about, at most about, or about 15, 30, 60, 90, 120, or 150, or is between any two of those values. In some embodiments, the weight ratio of the first group of fibers to the second group of fibers is about 10:1, 9:1, 8:1, 7:1, 6:1, 5:1, 4:1, 3:1, 2:1, or 1:1 or is between any two of those values. In some embodiments, the fiber microstructures dispersed within the liquid composition in step (a) comprise aramid fibers.

Particle microstructures dispersed or embedded within the liquid composition in step (a) can be of a variety of sizes. In some embodiments, the particles have an average diameter or average size between about 0.2 and 20 µm. In some embodiments, the average diameter or average size of the particles is at least about, at most about, or about 0.2, 0.3, 0.4, 0.5, 0.6, 0.7, 0.8, 0.9, 1.0, 1.5, 2.0, 2.5, 3.0, 3.5, 4.0, 4.5, 5.0, 6, 7, 8, 9, 10, 11, 12, 13, 14, 15, 16, 17, 18, 19, or 20 µm, or is between any two of those values. In some embodiments, the largest particles in the aerogel powder are at least about, at most about, or about 0.2, 0.3, 0.4, 0.5, 0.6, 0.7, 0.8, 0.9, 1.0, 1.5, 2.0, 2.5, 3.0, 3.5, 4.0, 4.5, 5.0, 6, 7, 8, 9, 10, 11, 12, 13, 14, 15, 16, 17, 18, 19, 20, 25, 30, 35, 40, 45, 50, 55, 60, 65, 70, 75, or 80 µm, or between any two of these values. In some embodiments, the aerogel particles in the powder are monosized. In some embodiments, the geometric standard deviation of the particle sizes in the aerogel powder is about 1.0, 1.1, 1.2, 1.3, 1.4, 1.5, 1.6, 1.7, 1.8, 1.9, or 2.0 or is between any two of those values. As used herein, the geometric standard deviation is calculated by dividing the median particle size ($d_{50}$) by the particle size at the 16th percentile in the particle size distribution ($d_{16}$). In some embodiments, the particle microstructures dispersed within the liquid composition in step (a) comprise PTFE particles, aerogel powder particles, or combinations thereof.

In some embodiments, aerogel powder particles dispersed in step (a) have been produced by milling an aerogel to create a powder and passing the powder through a sieve having holes between about 0.2 and 425 µm. In some embodiments, the sieve has holes that are at least about, at most about, or about 0.2, 0.3, 0.4, 0.5, 0.6, 0.7, 0.8, 0.9, 1.0, 1.5, 2.0, 2.5, 3.0, 3.5, 4.0, 4.5, 5.0, 6, 7, 8, 9, 10, 11, 12, 13, 14, 15, 16, 17, 18, 19, 20, 25, 30, 35, 40, 45, 50, 55, 60, 65, 70, 75, 80, 120, 160, 250, 350, or 425 µm, or between any two of these values.

In some embodiments, the microstructures dispersed or embedded in an aerogel comprise hydrophilic polymers and/or have been surface treated to become hydrophilic. This can enhance the ability of the microstructures to be dispersed within or wetted by an aqueous or polar liquid gel precursor in step (a). In some embodiments, no dispersing agents or surfactants are included in the liquid gel precursor composition of step (a).

The following includes definitions of various terms and phrases used throughout this specification.

"Aerogel," as used herein, refers to a unique class of low density and primarily open-cell materials formed by removing a mobile interstitial solvent phase from the pores of a gel structure supported by an open-celled polymeric material. By controlling the gel and evaporation system, shrinkage and pore collapse are avoided.

"Microstructure," as used herein, refers to a structure having a smallest dimension that is larger than 100 nm and having at least one dimension that is no larger than about 100 µm.

"Nanostructure," as used herein, refers to a structure having at least one dimension that is no larger than 100 nm.

"Fiber," as used herein, refers to an elongated structure having an approximately uniform diameter of at least 100 nm and up to 100 µm and an aspect ratio of at least 5.

"Organic polymer gel matrix," as used herein, refers to a gel matrix comprised of organic polymers. Such a matrix typically comprises polymer particles clustered together and arranged in such a way as to define voids, or "pores," within an aerogel.

The use of the words "a" or "an" when used in conjunction with the term "comprising," "including," "containing," or "having" in the claims and/or the specification may mean "one," but it is also consistent with the meaning of "one or more," "at least one," and "one or more than one."

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The aerogels of the present invention can "comprise," "consist essentially of," or "consist of" particular ingredients, components, compositions, etc. disclosed throughout the specification.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

Figure 1A:
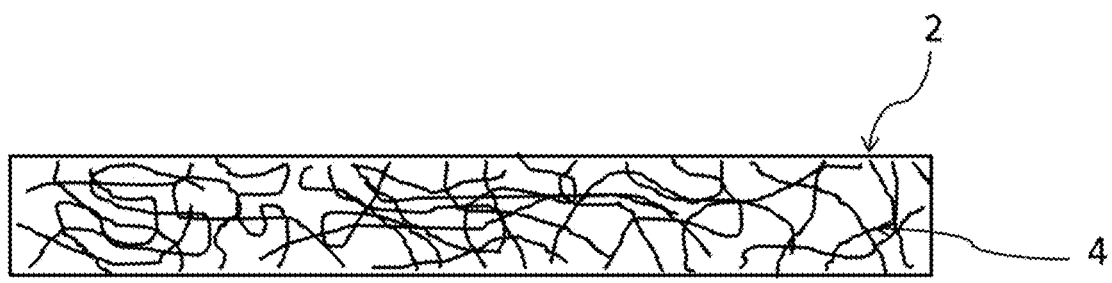
FIGS. 1A-1B show cross-sectional illustrations of some aerogel embodiments disclosed herein.

While the invention is susceptible to various modifications and alternative forms, specific embodiments thereof are shown by way of example in the drawings and may herein be described in detail. The drawings may not be to scale.

DETAILED DESCRIPTION

A discovery has been made that provides an organic polymer aerogel with superior thermal and mechanical properties. The organic polymer aerogel has microstructures comprised within the aerogel. The presence of the microstructures in a gel precursor solution is thought to affect the formation of the polymer gel matrix during gelation in a way that makes it more stable and less prone to collapse during the process of forming the aerogel by drying. It also leads to a favorable pore structure that enhances physical and thermal properties of the aerogel. For example, in some embodiments, the aerogels have a lower average pore size due to the inclusion of the microstructures, which lower average pore size results in superior thermal and mechanical properties. In some embodiments, the aerogel has a multi-modal (e.g., bimodal or trimodal) pore size distribution. Without wishing to be bound by theory, it is believed that the presence of the multi-modal pore size distribution throughout the aerogel network contributes to the low thermal conductivity (e.g., <40 mW/m·K at a temperature below 150° C.) of the aerogels of the present invention. The presence of different modes of polymer particle sizes in the wet-gel and fiber matrix is believed to prevent network collapse during drying, which allows the aerogels of the present invention to be produced by processes such as thermal drying or evaporative air drying in lieu of the more commonly used freeze-drying and super-critical drying processes. In addition, the microstructures themselves provide physical reinforcement to the gel matrix, enhancing its physical properties and protecting against cracking and collapse during drying.

These and other non-limiting aspects of the present invention are provided in the following subsections.

A. Organic Polymer Aerogels

Figure 1B:
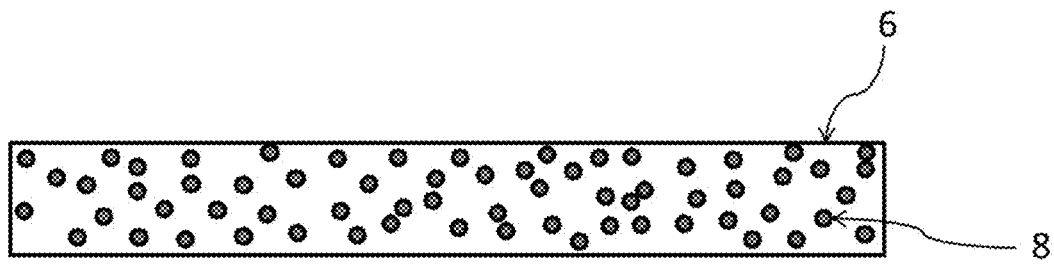

The organic polymer aerogels of the present invention include an organic polymer gel matrix and microstructures comprised in the non-fibrous organic polymer matrix. FIG. 1 provides a non-limiting illustration of a aerogels of the present invention, in which microstructures (e.g., fiber microstructures 4 or particle microstructures 8) are dispersed. In FIG. 1A, fiber microstructures 4 are dispersed within an aerogel 2. FIG. 1B illustrates an aerogel 6 in which particle microstructures 8 are dispersed within the aerogel 6.

1. Organic Polymer Gel Matrix

The organic polymer matrix of the present invention can be composed of a variety of organic polymers. In preferred embodiments, the reinforced aerogel matrix is made from resorcinol formaldehyde or polyimide. The organic components can include thermoplastic or thermoset polymers, co-polymers thereof, and blends thereof that are discussed throughout the present application. The polymers can be branched, linear, or cross-linked. The organic polymer aerogel can include polymers or polymer precursors of polyethylene terephthalate (PET), a polycarbonate (PC) family of polymers, polybutyrate adipate terephthalate (PBAT, a biodegradable random copolymer, specifically a copolyester of adipic acid, 1,4-butanediol and dimethyl terephthalate), poly (1,4-cyclohexylidene cyclohexane-1,4-dicarboxylate) (PCCD), glycol modified polycyclohexyl terephthalate (PCTG), poly(phenylene oxide) (PPO), polyvinyl chloride (PVC), polystyrene (PS), polymethyl methacrylate (PMMA), polyacrylic acid, polymethacrylic acid, polyethyleneimine, polyetherimide (PEI) and their derivatives, thermoplastic elastomer (TPE), terephthalic acid (TPA) elastomers, poly(cyclohexanedimethylene terephthalate) (PCT), polyethylene naphthalate (PEN), polyamide (PA), polysulfone sulfonate (PSS), sulfonates of polysulfones, polyether ether ketone (PEEK), polyether ketone ketone (PEKK), acrylonitrile butyldiene styrene (ABS), polyphenylene sulfide (PPS), unsaturated polyester resins, polyurethane (PU), polyoxybenzylmethylenglycolanhydride (e.g., bakelite), urea-formaldehyde, diallyl-phthalate, epoxy resin, epoxy vinylesters, cyanate esters of polycyanurates, dicyclopentadiene, phenolics, benzoxazines, polyacrylate, polyacrylonitrile, polyurea, polyamine, polyimide, polyether, polyester, polyvinyl alcohol (PVOH), polyvinyl butyral (PVB), polyfurfural alcohol, polyphenol, phenol furfuryl alcohol, melamine formaldehyde, resorcinol formaldehyde, cresol formaldehyde, phenol formaldehyde, polyvinyl alcohol dialdehyde, polycyanurate, polyacrylamide, various epoxies, agar, agarose, co-polymers thereof, or blends thereof. For the purpose of this disclosure PVOH and PVB can be derived from vinyl acetate which is derived from acetaldehyde and are not considered polyolefins. In particular embodiments, the reinforced polymer aerogels include an organic polymer matrix of a polymer selected from a polyamine, a polyamide, a polyimide, a poly(amide-imide), a poly(amic amide), a poly(ether imide), a polyphenol, a polyvinyl alcohol, a polyvinyl butyral, a polyurethane, a polyurea, a polyether, a polyester, a polyacid, a polycarbonate, or any combination thereof. The polymer can be included in a composition that includes said polymer and additives. Non-limiting examples of additives include coupling agents, antioxidants, heat stabilizers, flow modifiers, colorants, opacifiers, surfactants, etc., or any combinations thereof.

The characteristics or properties of the final polymer are significantly impacted by the choice of precursor monomers, which are used to produce the polymer. Factors to be considered when selecting monomers include the properties of the final polymer, such as the thermal conductivity, mechanical properties, flexibility, thermal stability, coefficient of thermal expansion (CTE), coefficient of hydroscopic expansion (CHE) and any other properties specifically desired, as well as cost. Often, certain important properties of a polymer for a particular use can be identified. Other properties of the polymer may be less significant, or may have a wide range of acceptable values; so many different monomer combinations could be used.

Other factors to be considered in the selection of precursor monomers include the expense and availability of the monomers chosen. Commercially available monomers that are produced in large quantities generally decrease the cost of producing polymer materials since such monomers are in general less expensive than monomers produced on a lab scale and pilot scale. Additionally, the use of high purity commercially available monomers can improve the overall reaction efficiency because additional reactions are not required to produce a monomer, which is then incorporated into the polymer. A potential supplier of precursor monomers includes Sigma-Aldrich, USA.

In some embodiments, the backbone of the polymer includes reactive substituents. The substituents (e.g., chain end groups, oligomers, functional groups, etc.) can be directly bonded to the backbone, linked to the backbone through a linking group (e.g., a tether or a flexible tether), or brought about by further reaction of polymer backbone. For example, partial hydrolysis of polyester or polycarbonate polymer can release functional groups that can be used in reinforcing. Any further chemical or physical modification of the polymer backbone for this purpose is contemplated herein. In preferred aspects, the polymer precursor includes a reinforceable functional group selected from amine, amide, imide, ether, phenol, alcohol, butyral, urethane, urea, carbonate, ester, ether, or acid, or any combination thereof. In other embodiments, a compound or particles can be incorporated (e.g., blended and/or encapsulated) into the polymer structure without being covalently bound. In some instances, the incorporation of the compound or particles can be performed during polymerization. In some instances, particles can aggregate, thereby producing polymers having domains with different concentrations of the non-covalently bound compounds or particles.

In some instances, the polymer compositions used to prepare the aerogel of the present invention can include multifunctional monomers with at least three reactive functionalities. The multifunctional monomers can be a substituted or unsubstituted aliphatic multifunctional amine, a substituted or unsubstituted aromatic multifunctional amine, or a multifunctional amine that includes a combination of an aliphatic and two aromatic groups, or a combination of an aromatic and two aliphatic groups. A non-limiting list of possible multifunctional amines include propane-1,2,3-triamine, 2-aminomethylpropane-1,3-diamine, 3-(2-aminoethyl)pentane-1,5-diamine, bis(hexamethylene)triamine, N',N'-bis(2-aminoethyl)ethane-1,2-diamine, N',N'-bis(3-aminopropyl)propane-1,3-diamine, 4-(3-aminopropyl)heptane-1,7-diamine, N',N'-bis(6-aminohexyl)hexane-1,6-diamine, benzene-1,3,5-triamine, cyclohexane-1,3,5-triamine, melamine, N-2-dimethyl-1,2,3-propanetriamine, diethylenetriamine, 1-methyl or 1-ethyl or 1-propyl or 1-benzyl-substituted diethylenetriamine, 1,2-dibenzyldiethylenetriamine, lauryldiethylenetriamine, N-(2-hydroxypropyl)diethylenetriamine, N,N-bis(1-methylheptyl)-N-2-dimethyl-1,2,3-propanetriamine, 2,4,6-tris(4-(4-aminophenoxy)phenyl)pyridine, N,N-dibutyl-N-2-dimethyl-1,2,3-propanetriamine, 4,4'-(2-(4-aminobenzyl)propane-1,3-diyl)dianiline, 4-((bis(4-aminobenzyl)amino)methyl)aniline, 4-(2-(bis(4-aminophenethyl)amino)ethyl)aniline, 4,4'-(3-(4-aminophenethyl)pentane-1,5-diyl)dianiline, 1,3,5-tris(4-aminophenoxy)benzene, 4,4',4"-methanetriyltrianiline, N,N,N',N'-Tetrakis(4-aminophenyl)-1,4-phenylenediamine, a polyoxypropylenetriamine, octa(aminophenyl)polyhedral oligomeric silsesquioxane, or combinations thereof. A specific example of a polyoxypropylenetriamine is JEFFAMINE® T-403 from Huntsman Corporation, The Woodlands, TX USA. The multifunctional monomers can also include alcohols, acids, esters, anhydrides, acid chlorides, etc. Suitable multifunctional monomers include, but are not limited to, multifunctional alcohols such as 2-methyl-1,3-propanediol, 1,2-propanediol, 1,3-propanediol, glycerol, and ethylene glycol, arabitol, erythritol, glycerol, isomalt, lactitol, maltitol, mannitol, sorbitol, xylitol, sucrose, sucralose, benzene-1,3,5-triol, cyclohexane-1,2,4-triol; multifunctional acids such as 1,3,5-cyclohexanetricarboxylic acid, Kemp's triacid, 1,2,3-benzenetricarboxylic acid, 1,2,4-benzenetricarboxylic acid, 1,3,5-benzenetricarboxylic acid, 5-(4-carboxy-2-nitrophenoxy)-isophthalic acid, 1,2,3,4-butanetetracarboxylic acid, tetrahydrofuran-2,3,4,5-tetracarboxylic acid, 2,2',2",2'''-[1,2-ethanediylidene-tetrakis(thio)]-tetrakisacetic acid, cyclobutanetetracarboxylic acid, 1,2,4,5-benzenetetracarboxylic acid, mellitic acid, 1,4,5,8-naphthalene tetracarboxylic acid, and 1,2,3,4,5,6-cyclohexanehexacarboxylic acid; multifunctional esters such as methyl, ethyl or butyl esters of the above acids and triethylmethanetricarboxylate, triethyl 1,1,2-ethanetricarboxylate, tetraethyl 1,1,2,2-ethanetetracarboxylate, tetraethyl ethylenetetracarboxylate, tetramethyl exo,exo-tetracycloundeca-3,8-diene-3,4,8,9-tetracarboxylate, and pentamethyl cyclopentadiene-1,2,3,4,5-pentacarboxylate; anhydrides such as 1,2,4-benzenetricarboxylic anhydride, 1,2,4,5-benzenetetracarboxylic dianhydride, and bicyclo[2,2,2]oct-7-ene-2,3,5,6-tetracarboxylic anhydride; and acid chlorides such as 1,3,5-benzenetricarbonyl chloride.

Polymer matrices comprising multifunctional monomers can be strengthened by cross-linking. Methods of cross-linking polymers are known in the art, as in, for example, U.S. Pat. No. 8,637,582 to Gawryla & Schiraldi and U.S. Pat. No. 9,434,832 to Meador. In some embodiments, the cross-linked polymer matrix comprises a cross-linked resorcinol formaldehyde polymer.

2. Fiber Microstructures

Some embodiments of the aerogels disclosed herein have fiber microstructures dispersed or embedded within the aerogel. The fibers can be composed of a variety of materials. In some embodiments, the fiber microstructures comprise thermoplastic polymer, thermoset polymer, or combinations thereof. A thermoplastic polymer fiber can be a fiber of polyethylene terephthalate (PET), a polycarbonate (PC) family of polymers, polybutylene terephthalate (PBT), poly (1,4-cyclohexylidene cyclohexane-1,4-dicarboxylate) (PCCD), glycol modified polycyclohyexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) and their derivatives, thermoplastic elastomer (TPE), terephthalic acid (TPA) elastomers, poly (cyclohexanedimethylene terephthalate) (PCT), plyethylene naphthalate (PEN), polyamide (PA), polysulfone sulfonate (PSS), sulfonates of polysulfones, polyether ether ketone (PEEK), polyether ketone ketone (PEKK), acrylonitrile butyldiene styrene (ABS), polyphenylene sulfide (PPS), co-polymers thereof, or blends thereof. In certain aspects the thermoset fiber is a fiber of aramid, polyimide, polybenzoxazole, polyurethane, or blends thereof. The fiber microstructure can be vinylon, polyolefin, polyethylene, or polyester fiber. In a preferred embodiment, the fibers are composed of aramid, such as those available from Teijin Chemicals Company (Japan).

In some embodiments, the fiber microstructures comprise natural, synthetic, or semi-synthetic fibers, or combinations thereof. In some embodiments, the fiber microstructures comprise vegetable, wood, animal, mineral, or biological fibers, or combinations thereof. In some embodiments, the fiber microstructures comprise cellulose, rayon, bamboo, diacetate, or triacetate fibers, or combinations thereof. In some embodiments, the fiber microstructures comprise metal, carbon, carbide, glass, or mineral fibers, or combinations thereof. In some embodiments, the fiber microstructures comprise inorganic fibers such as glass fibers, carbon fibers, ceramic fibers, basalt fibers, rock wool, steel or other metal fibers, or mixtures thereof.

The thermal and structural characteristics of the microstructures-including both fiber microstructures and particle microstructures—can affect the thermal and structural characteristics of the aerogel in which they are dispersed or embedded. The microstructures can be chosen based on their thermal conductivity, as a lower thermal conductivity of the microstructures can lead to a lower thermal conductivity of the final aerogel and a higher thermal conductivity of the microstructures can lead to a higher thermal conductivity of the final aerogel. Thus, the thermal properties of the aerogel can be tuned by adjusting the size, strength, amount, and materials of the microstructures. Likewise, the mechanical properties of the microstructures affect the mechanical properties of the aerogel. Thus, the mechanical properties of the aerogel can also be tuned by adjusting the size, strength, amount, and materials of the microstructures.

In addition, the microstructures disclosed herein-including both fiber and particle microstructures—can be chosen based on their water adsorption characteristics. Microstructures that have lower levels of water adsorption (i.e., that are less hygroscopic), can increase the long-term stability of aerogels since adsorbed water can degrade strength, increase mass, increase thermal conductivity, and affect radiofrequency properties over time. One example of a polymer material that has low hygroscopicity is PTFE.

3. Particle Microstructures

Some embodiments of the aerogels disclosed herein have non-fibrous particle microstructures dispersed or embedded within the aerogel. A particle microstructure is distinguished from a fiber microstructure by the lower aspect ratio of the former relative to the latter. The aspect ratio is calculated by dividing a structure's largest dimension by its smallest dimension. Thus, a spherical or cubic structure would have an aspect ratio of 1. More elongated structures have higher aspect ratios. As used herein, a structure is a considered a fiber herein if its aspect ratio is greater than or equal to 5, and a structure is considered a particle if its aspect ratio is less than 5. The particle microstructures of the aerogels described herein can be of a variety of shapes, including without limitation spherical, approximately spherical, or irregularly shaped.

The particles can be composed of a variety of materials. In some embodiments, the particle microstructures comprise thermoplastic polymer, thermoset polymer, or combinations thereof. A thermoplastic polymer particle can be a fiber of polyethylene terephthalate (PET), a polycarbonate (PC) family of polymers, polybutylene terephthalate (PBT), poly (1,4-cyclohexylidene cyclohexane-1,4-dicarboxylate) (PCCD), glycol modified polycyclohyexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) and their derivatives, thermoplastic elastomer (TPE), terephthalic acid (TPA) elastomers, poly (cyclohexanedimethylene terephthalate) (PCT), plyethylene naphthalate (PEN), polyamide (PA), polysulfone sulfonate (PSS), sulfonates of polysulfones, polyether ether ketone (PEEK), polyether ketone ketone (PEKK), acrylonitrile butyldiene styrene (ABS), polyphenylene sulfide (PPS), co-polymers thereof, or blends thereof. In certain aspects the thermoset particle is a particle of aramid, polyimide, plybenzoxazole, polyurethane, or blends thereof. The particle microstructure can be vinylon, polyolefin, polyethylene, or polyester fiber. In a preferred embodiment, the particles are PTFE particles, like those available from Laurel Products and sold as Ultraflor™. The Ultraflor™ UF-8TA PTFE powder, which has 400 nm spherical primary particles with a hydrophilic surface coating, is particularly preferred.

In some embodiments, the particle microstructures comprise inorganic particles such as glass particles, carbon particles, ceramic particles, basalt particles, steel or other metal particles, or mixtures thereof.

4. Pore Size Distribution

In some embodiments disclosed herein, aerogels are characterized by their pore size distribution. Pore size distribution can be measured in a variety of ways known to those of ordinary skill in the art, including, for example, nitrogen gas adsorption and mercury intrusion porosimetry (MIP). In some embodiments, the pore size distribution is at least bimodal. In such embodiments, there are at least two distinct groups, or "modes," of pore diameters in the aerogel. For example, an aerogel with a bimodal distribution may have one population of pores with an average diameter of less than 65 nm and another population of pores with an average diameter of greater than 65 nm, with no additional distinct groups of pores. Other values can be used as the point between two or more distinct populations of pores. For example, in some embodiments an aerogel with a bimodal distribution may have one population of pores with an average diameter of less than 50 nm and another population of pores with an average diameter of greater than 50 nm, with no additional distinct groups of pores. Distinct modes of pores can often be visualized in a plot showing the pore size distribution, which can be a plot of pore volume or pore number vs. pore diameter. In such plots, a mode can be visualized as a peak. In a multi-modal pore size distribution, more than one distinct peak can be seen. Some embodiments may have 2, 3, 4, 5, or more distinct modes. An embodiment with at least three distinct modes of pores is described herein as having an at least trimodal pore size distribution.

The pore size distribution can be affected during the manufacturing process by the relative concentration of a basic compound, such as calcium carbonate, present in a gel precursor solution. For example, decreasing the molar ratio of base in the gel precursor solution can increase the population of pores having relatively large diameters (e.g., greater than 10 µm), leading to the creation of one or more large-diameter modes.

5. Tensile Strength

In some embodiments described herein, the organic polymer aerogels are characterized by their tensile strength, which is also known as ultimate tensile strength (UTS). This is a measure of the capacity of a material to withstand loads tending to elongate. The tensile strength of embodiments described herein are significantly greater than that of previously available aerogels. As used herein, the tensile strength is the ultimate tensile strength as measured according to American Standard Testing Method (ASTM) D5034 Standard Specification for Breaking Force and Elongation of Textile Fabrics (Grab Method). The tensile strength may vary depending on the direction in which the test is performed. For some embodiments of the aerogels described herein, the tensile strength is greater when measured in the machine direction than when measured in the cross direction.

B. Synthesis of Organic Polymer Aerogels

Figure 2:
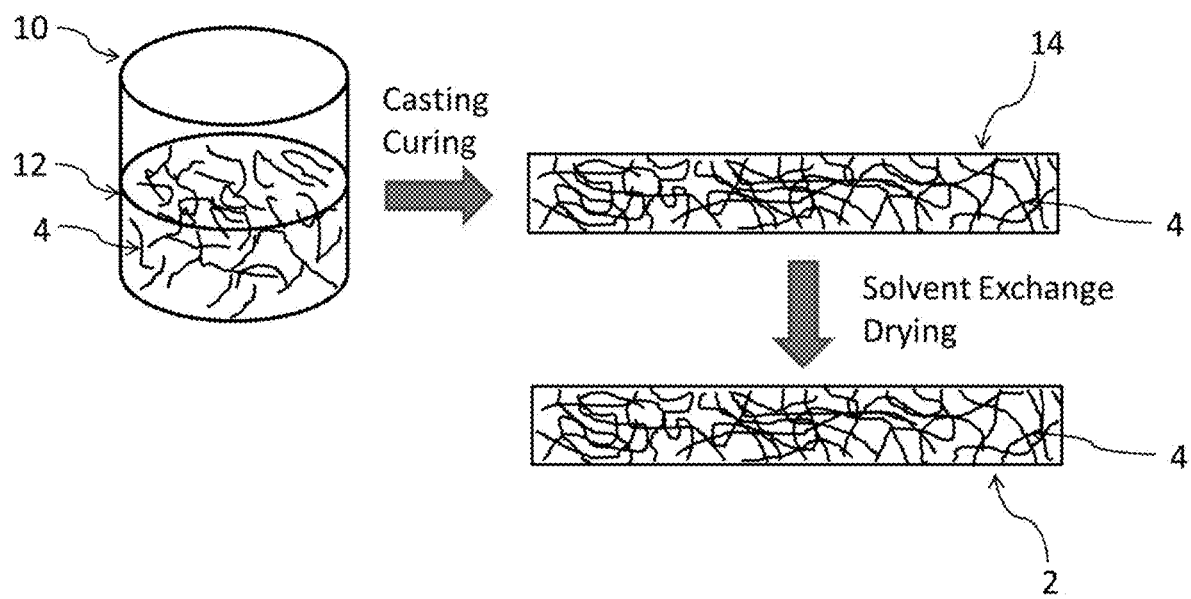
FIG. 2 is an illustration of a process of making an aerogel having fiber microstructures comprised within the aerogel.

Aerogels of the present disclosure can be made using a multi-step process that includes 1) dispersion of microstructures in a liquid organic polymer gel precursor composition (or otherwise causing microstructures to be embedded in the precursor liquid), 2) formation of an organic polymer gel from the precursor, 3) solvent exchange and 4) drying of the gel to form the aerogel. FIG. 2 illustrates an exemplary method of making an aerogel having microstructures dispersed therein. Fiber microstructures 4 are dispersed in a container 10 containing a liquid gel precursor composition 12. The liquid gel precursor composition 12 is then cast and cured to form a wet polymer gel 14 having fiber microstructures 4 dispersed therein. The wet polymer gel 14 is then subjected to solvent exchange and is dried to form an aerogel 2 having fiber microstructures 4 dispersed therein. The same process can be performed using particle microstructures in place of the fiber microstructures 4. These process steps are discussed in more detail below.

1. Dispersing or Embedding Microstructures in a Gel Precursor Composition

The first step in methods of making an aerogel described herein is to disperse microstructures in a liquid gel precursor composition or otherwise embed microstructures in the liquid precursor, such as by saturating a scrim, cloth, or mat with the liquid precursor. Dispersion can be accomplished by a variety of methods known in the art. For example, the microstructures can be added to a liquid gel precursor with mechanical stirring by square- or round-bladed impellers at speeds of 5-50,000 rpm. Higher speeds may reduce the time required to achieve good dispersion. As another example, microstructures can be dispersed by hand stirring the gel precursor composition. Depending on the characteristics of the microstructures being dispersed and the solvent used in the gel precursor, dispersion times and mixing speeds can be adjusted to ensure uniform dispersion of the microstructures. For example, dispersion can continue for as little as a few seconds or for as long as 12 hours or more. Embedding may similarly be accomplished by a variety of methods known in the art. For example, a cloth may be pulled through a vat containing liquid gel precursor such that it becomes saturated. As another example, liquid gel precursor may be dispensed directly onto a mat supported by a substrate within a pressurized chamber.

The shear properties of a mechanical mixer can be influenced by the type of mixing blades used. For example, the Inventors have observed that mixing with a Cowles blade, which provides higher shear mixing than square bladed mixers, provides for more efficient dispersion of PTFE particles and other microstructures. Other suitable dispersing methods include using a magnetic stir bar, a round blade propeller, a square blade impeller, a homogenizer/rotor stator, media milling, a three-roll mill, and a five-roll mill.

Dispersion of the microstructures can be performed in a flask or other container, after which the gel precursor along with the dispersed microstructures can be poured into a casting container. Additionally or alternatively, dispersion can be performed directly in a casting container. The dispersing process can be performed in a liquid gel precursor composition before or after all of the necessary ingredients for gel formation are added to the composition. For example, the microstructures can be added to the solvent and dispersed therein before any polymer or polymer precursors are added. Dispersion can continue while such additional ingredients are added, or can be halted.

The liquid gel precursor composition eventually contains all of the ingredients necessary for formation of an organic polymer gel. Often, organic polymer gels are prepared from organic monomers by polymerization, such as step-growth polymerization, chain-growth polymerization, or photopolymerization. For example, if a polyamide aerogel is desired, at least one diacid monomer can be reacted with at least one diamino monomer in a reaction solvent by condensation in a step-growth polymerization to form a polyamide. As discussed above, a number of other polymers, co-polymers thereof, or blends thereof can be used in the aerogels disclosed herein. In some instances, the polymer matrix comprises a polyimide matrix. If a polyimide aerogel is desired, at least one acid monomer can be reacted with at least one diamino monomer in a reaction solvent to form a poly(amic acid). Numerous acid monomers and diamino monomers may be used to synthesize the poly(amic acid). In one aspect, the poly(amic acid) is contacted with an imidization catalyst in the presence of a chemical dehydrating agent to form a polymerized polyimide gel via an imidization reaction. Any imidization catalyst suitable for driving the conversion of polyimide precursor to the polyimide state is suitable. Preferred chemical imidization catalysts comprise at least one compound selected from the group consisting of pyridine, methylpyridines, quinoline, isoquinoline, 1,8-diazabicyclo[5.4.0]undec-7-ene (DBU), triethylenediamine, lutidine, N-methylmorpholine, triethylamine, tripropylamine, tributylamine, imidazole or a substituted imidazole, a triazole or a substituted triazole, a tetrazole or substituted tetrazole, a purine or a substituted purine, a pyrazole or a substituted pyrazole, other trialkylamines, or combinations thereof. Any dehydrating agent suitable for use in formation of an imide ring from an amic acid precursor is suitable. Preferred dehydrating agents comprise at least one compound selected from the group consisting of acetic anhydride, propionic anhydride, n-butyric anhydride, benzoic anhydride, trifluoroacetic anhydride, oxalyl chloride, thionyl chloride, phosphorus trichloride, dicyclohexylcarbodiimide, 1,1'-carbonyldiimidazole (CDI), di-tert-butyl dicarbonate (Boc$_2$O), or combinations thereof.

In some embodiments, the polymer matrix comprises a resorcinol formaldehyde polymer. To prepare a gel comprising this polymer, resorcinol and formaldehyde are combined together in aqueous solution in the presence of a metal carbonate such as lithium carbonate (Li$_2$CO$_3$), sodium carbonate (Na$_2$CO$_3$), potassium carbonate (K$_2$CO$_3$), rubidium carbonate (Rb$_2$CO$_3$), cesium carbonate (Cs$_2$CO$_3$), magnesium carbonate (MgCO$_3$), calcium carbonate (CaCO$_3$), strontium carbonate (SrCO$_3$), barium carbonate (BaCO$_3$), or combinations thereof. The resorcinol and formaldehyde combine to form the resorcinol formaldehyde polymer particles, which form the gel matrix.

The reaction solvent for polymerization, cross-linking, or both can be amide solvents such as but not limited to formamide, N-methylformamide, N,N-dimethylformamide, N,N-diethylformamide, N,N-dimethylacetamide, N,N-diethylacetamide, 2-pyrrolidone, N-methyl-2-pyrrolidone, 1-methyl-2-pyrrolidinone, N-cyclohexyl-2-pyrrolidone, N-vinylacetamide, N-vinylpyrrolidone, hexamethylphosphoramide, and 1,13-dimethyl-2-imidazolidinone; organosulfur solvents such as but not limited to dimethylsulfoxide, diethylsulfoxide, diethyl sulfoxide, methylsulfonylmethane, and sulfolane; ether solvents including but not limited to cyclopentyl methyl ether, di-tert-butyl ether, diethyl ether, diethylene glycol diethyl ether, diglyme, diisopropyl ether, dimethoxyethane, dimethoxymethane, 1,4-dioxane, ethyl tert-butyl ether, glycol ethers, methoxyethane, 2-(2-methoxyethoxy)ethanol, methyl tert-butyl ether, 2-methyltetrahydrofuran, morpholine, tetraglyme, tetrahydrofuran, tetrahydropyran, and triglyme; hydrocarbon solvents including but not limited to benzene, cycloheptane, cyclohexane, cyclohexene, cyclooctane, cyclopentane, decalin, dodecane, durene, heptane, hexane, limonene, mesitylene, methylcyclohexane, naphtha, octadecene, pentamethylbenzene, pentane, pentanes, petroleum benzene, petroleum ether, toluene, tridecane, turpentine, and xylene; nitro solvents including but not limited to nitrobenzene, nitroethane, and nitromethane; alcohol solvents including but not limited to methanol, ethanol, 1-propanol, 2-propanol, 1-butanol, 2-butanol, isobutanol, tert-butanol, 3-methyl-2-butanol, 3,3-dimethyl-2-butanol, 2-pentanol, 3-pentanol, 2,2-dimethylpropan-1-ol, cyclohexanol, diethylene glycol, tert-amyl alcohol, phenols, cresols, xylenols, catechol, benzyl alcohol, 1,4-butanediol, 1,2,4-butanetriol, butanol, 2-butanol, N-butanol, tert-butyl alcohol, diethylene glycol, ethylene glycol, 2-ethylhexanol, furfuryl alcohol, glycerol, 2-(2-methoxyethoxy)ethanol, 2-methyl-1-butanol, 2-methyl-1-pentanol, 3-methyl-2-butanol, neopentyl alcohol, 2-pentanol, 1,3-propanediol, and propylene glycolcycol; ketone solvents including but not limited to hexanone, acetone, methyl ethyl ketone, methyl isobutyl ketone, disobutyl ketone, acetophenone, butanone, cyclopentanone, ethyl isopropyl ketone, 2-hexanone, isophorone, mesityl oxide, methyl isopropyl ketone, 3-methyl-2-pentanone, 2-pentanone, and 3-pentanoneacetyl acetone; halogenated solvents including but not limited to benzotrichloride, bromoform, bromomethane, carbon tetrachloride, chlorobenzene, 1,2-dichlorobenzene, 1,3-dichlorobenzene, 1,4-dichlorobenzene, chlorofluorocarbon, chloroform, chloromethane, 1,1-dichloro-1-fluoroethane, 1,1-dichloroethane, 1,2-dichloroethane, 1,1-dichloroethene, 1,2-dichloroethene, dichloromethane, diiodomethane, FC-75, haloalkane, halomethane, hexachlorobutadiene, hexafluoro-2-propanol, parachlorobenzotrifluoride, perfluoro-1,3-dimethylcyclohexane, perfluorocyclohexane, perfluorodecalin, perfluorohexane, perfluoromethylcyclohexane, perfluoromethyldecalin, perfluorooctane, perfluorotoluene, perfluorotripentylamine, tetrabromomethane, 1,1,1,2-tetrachloroethane, 1,1,2,2-tetrachloroethane, tetrachloroethylene, 1,1,1-tribromoethane, 1,3,5-trichlorobenzene, 1,1,1-trichloroethane, 1,1,2-trichloroethane, trichloroethylene, 1,2,3-trichloropropane, 2,2,2-trifluoroethanol, and trihalomethane; ester solvents including but not limited to methyl acetate, ethyl acetate, butyl acetate, 2-methoxyethyl acetate, benzyl benzoate, bis(2-ethylhexyl) adipate, bis(2-ethylhexyl) phthalate, 2-butoxyethanol acetate, sec-butyl acetate, tert-butyl acetate, diethyl carbonate, dioctyl terephthalate, ethyl acetate, ethyl acetoacetate, ethyl butyrate, ethyl lactate, ethylene carbonate, hexyl acetate, isoamyl acetate, isobutyl acetate, isopropyl acetate, methyl acetate, methyl lactate, methyl phenylacetate, methyl propionate, propyl acetate, propylene carbonate, and triacetin; water, or mixtures thereof. The reaction solvent and other reactants can be selected based on the compatibility with the materials and methods applied i.e. if the polymerized gel is to be cast onto a support film, injected into a moldable part, or poured into a shape for further processing into a workpiece. The reaction solvent and other reactants will be selected based on the compatibility with the fiber material.

In some aspects, an agent (e.g., curing agents, dehydration agents, radical initiators (photo or thermal) or the like) suitable for driving the conversion of the reactants (i.e. polymer precursor, polymers) to the polymer matrix can be employed. The conversion may also be driven by heat or irradiation with electromagnetic radiation (e.g., infrared or UV radiation). Curing agents can be selected based on the types of polymers formed. Non-limiting examples of such compounds include pyridine, methylpyridines, quinoline, isoquinoline, 1,8-diazabicyclo[5.4.0]undec-7-ene (DBU), DBU phenol salts, carboxylic acid salts of DBU, triethylenediamine, carboxylic acid slats of triethylenediamine, lutidine, N-methylmorpholine, triethylamine, tripropylamine, tributylamine, other trialkylamines, imidazole, 2-methyl imidazole, 2-ethyl-4-methylimidazole, or combinations thereof. Dehydrating agents may include acetic anhydride, propionic anhydride, n-butyric anhydride, benzoic anhydride, trifluoroacetic anhydride, oxalyl chloride, thionyl chloride, phosphorus trichloride, dicyclohexylcarbodiimide, 1,1'-carbonyldiimidazole (CDI), di-tert-butyl dicarbonate (Boc$_2$O), or combinations thereof. Radical initiators include azobisisobutyronitrile (AIBN), benzoyl peroxide, 2,2-dimethoxy-2-phenylacetophenone (DMPA) and the like, or combination thereof.

2. Preparation of the Organic Polymer Gel

After the microstructures are dispersed or embedded in the liquid gel precursor composition, the organic polymer gel can be cast and cured to form a wet polymer gel. This can be accomplished by, for example, pouring the precursor solution into a casting container or onto a casting sheet. Gelation, also referred to herein as "curing," causes the creation of a wet gel with microstructures dispersed or embedded therein.

3. Solvent Exchange

After the wet gel is synthesized, it can be desirable to conduct one or more solvent exchanges wherein the reaction solvent used in the gel precursor is exchanged for another solvent more suitable for the drying step. Accordingly, in one embodiment, a solvent exchange can be conducted wherein the wet gel is placed inside of a vessel and submerged in a mixture comprising the reaction solvent and the second solvent. Then, a high-pressure atmosphere is created inside of the vessel thereby forcing the second solvent into the reinforced polymerized gel and displacing a portion of the reaction solvent. Alternatively, the solvent exchange step may be conducted without the use of a high-pressure environment. It may be necessary to conduct a plurality of rounds of solvent exchange. The time necessary to conduct the solvent exchange will vary depending upon the type of polymer undergoing the exchange as well as the reaction solvent and second solvent being used. In one embodiment, each solvent exchange lasts approximately twenty-four hours. In another embodiment, each solvent exchange lasts approximately 30 minutes. In some embodiments, the solvent exchange can be even shorter. For example, solvent exchange for thin film wet gels can be completed in as little as 1 minute.

Exemplary second solvents include amide solvents such as but not limited to formamide, N-Methylformamide, N,N-dimethylformamide, N,N-diethylformamide, N,N-dimethylacetamide, N,N-diethylacetamide, 2-pyrrolidone, N-methyl-2-pyrrolidone, 1-methyl-2-pyrrolidinone, N-cyclohexyl-2-pyrrolidone, N-vinylacetamide, N-vinylpyrrolidone, hexamethylphosphoramide, and 1,3-dimethyl-2-imidazolidinone; organosulfur solvents such as but not limited to dimethylsulfoxide, diethylsulfoxide, diethyl sulfoxide, methylsulfonylmethane, and sulfolane; ether solvents including but not limited to cyclopentyl methyl ether, di-tert-butyl ether, diethyl ether, diethylene glycol diethyl ether, diglyme, diisopropyl ether, dimethoxyethane, dimethoxymethane, 1,4-dioxane, ethyl tert-butyl ether, glycol ethers, methoxyethane, 2-(2-methoxyethoxy)ethanol, methyl tert-butyl ether, 2-methyltetrahydrofuran, morpholine, tetraglyme, tetrahydrofuran, tetrahydropyran, and triglyme; hydrocarbon solvents including but not limited to benzene, cycloheptane, cyclohexane, cyclohexene, cyclooctane, cyclopentane, decalin, dodecane, durene, heptane, hexane, limonene, mesitylene, methylcyclohexane, naphtha, octadecene, pentamethylbenzene, pentane, pentanes, petroleum benzene, petroleum ether, toluene, tridecane, turpentine, and xylene; nitro solvents including but not limited to nitrobenzene, nitroethane, and nitromethane; alcohol solvents including but not limited to methanol, ethanol, 1-propanol, 2-propanol, 1-butanol, 2-butanol, isobutanol, tert-butanol, 3-methyl-2-butanol, 3,3-dimethyl-2-butanol, 2-pentanol, 3-pentanol, 2,2-dimethylpropan-1-ol, cyclohexanol, diethylene glycol, tert-amyl alcohol, phenols, cresols, xylenols, catechol, benzyl alcohol, 1,4-butanediol, 1,2,4-butanetriol, butanol, 2-butanol, N-butanol, tert-butyl alcohol, diethylene glycol, ethylene glycol, 2-ethylhexanol, furfuryl alcohol, glycerol, 2-(2-methoxyethoxy)ethanol, 2-methyl-1-butanol, 2-methyl-1-pentanol, 3-methyl-2-butanol, neopentyl alcohol, 2-pentanol, 1,3-propanediol, and propylene glycolcycol; ketone solvents including but not limited to hexanone, acetone, methyl ethyl ketone, methyl isobutyl ketone, disobutyl ketone, acetophenone, butanone, cyclopentanone, ethyl isopropyl ketone, 2-hexanone, isophorone, mesityl oxide, methyl isopropyl ketone, 3-methyl-2-pentanone, 2-pentanone, and 3-pentanoneacetyl acetone; halogenated solvents including but not limited to benzotrichloride, bromoform, bromomethane, carbon tetrachloride, chlorobenzene, 1,2-dichlorobenzene, 1,3-dichlorobenzene, 1,4-dichlorobenzene, chlorofluorocarbon, chloroform, chloromethane, 1,1-dichloro-1-fluoroethane, 1,1-dichloroethane, 1,2-dichloroethane, 1,1-dichloroethene, 1,2-dichloroethene, dichloromethane, diiodomethane, FC-75, haloalkane, halomethane, hexachlorobutadiene, hexafluoro-2-propanol, parachlorobenzotrifluoride, perfluoro-1,3-dimethylcyclohexane, perfluorocyclohexane, perfluorodecalin, perfluorohexane, perfluoromethylcyclohexane, perfluoromethyldecalin, perfluorooctane, perfluorotoluene, perfluorotripentylamine, tetrabromomethane, 1,1,1,2-tetrachloroethane, 1,1,2,2-tetrachloroethane, tetrachloroethylene, 1,1,1-tribromoethane, 1,3,5-trichlorobenzene, 1,1,1-trichloroethane, 1,1,2-trichloroethane, trichloroethylene, 1,2,3-trichloropropane, 2,2,2-trifluoroethanol, and trihalomethane; ester solvents including but not limited to methyl acetate, ethyl acetate, butyl acetate, 2-methoxyethyl acetate, benzyl benzoate, bis(2-ethylhexyl) adipate, bis(2-ethylhexyl) phthalate, 2-butoxyethanol acetate, sec-butyl acetate, tert-butyl acetate, diethyl carbonate, dioctyl terephthalate, ethyl acetate, ethyl acetoacetate, ethyl butyrate, ethyl lactate, ethylene carbonate, hexyl acetate, isoamyl acetate, isobutyl acetate, isopropyl acetate, methyl acetate, methyl lactate, methyl phenylacetate, methyl propionate, propyl acetate, propylene carbonate, and triacetin; water, and mixtures thereof. Each second solvent has a freezing point. For example tert-butyl alcohol has a freezing point of 25.5 degrees Celsius and water has a freezing point of 0 degrees Celsius under one atmosphere of pressure. Preferably, at least one solvent exchange is performed with acetone.

The temperature and pressure used in the solvent exchange process may be varied. The duration of the solvent exchange process can be adjusted by performing the solvent exchange at a varying temperatures or atmospheric pressures, or both, provided that the pressure and temperature inside the pressure vessel does not cause either the first solvent or the second solvent to leave the liquid phase and become gaseous phase, vapor phase, solid phase, or supercritical fluid. Generally, higher pressures and/or temperatures decrease the amount of time required to perform the solvent exchange, and lower temperatures and/or pressures increase the amount of time required to perform the solvent exchange.

4. Cooling and Drying

After the wet gel has undergone solvent exchange, it is desirable to conduct a drying step wherein the solvent within the gel is removed. The drying step can be supercritical drying, subcritical drying, thermal drying, evaporative air-drying, or any combination thereof. In one embodiment, the gel can be dried by evaporative air drying under ambient conditions, for example by evaporating the solvent under a stream of air or anhydrous gas. In this instance the solvent in the gel is removed by evaporation and pore collapse is prevented by the reinforced matrix and the gel network. The drying may also be assisted by heating or irradiating with electromagnetic radiation.

In another embodiment, after solvent exchange the polymerized reinforced gel is exposed to subcritical drying. In this instance the gel is cooled below the freezing point of the second solvent and subjected to a freeze-drying or lyophilization process to produce the aerogel. For example, if the second solvent is water, then the polymerized gel is cooled to below 0° C. After cooling, the polymerized gel is subjected to a vacuum for a period of time wherein the second solvent is allowed to sublime.

In still another embodiment, after solvent exchange the gel is exposed to subcritical drying with optional heating after the majority of the second solvent has been removed through sublimation. In this instance the partially dried gel material is heated to a temperature near or above the boiling point of the second solvent for a period of time. The period of time can range from a few hours to several days, although a typical period of time is approximately 4 hours. During the sublimation process, a portion of the second solvent present in the gel has been removed, leaving the aerogel.

The final aerogels can be any width or length. The aerogel can be in the form of defined geometry (e.g., a square or circular patch) or in the form of a sheet or roll. In some instances, the internally reinforced aerogels can have a width up to 6 meters and a length of up to 10 meters, or from 0.01 to 6 meters, 0.5 to 5 meters, 1 to 4 meters, or any range in between, and a length of 1 to 10,000 meters, 5 to 1,000 meters, 10 to 100 meters or any range there between. The width of the composite can be 0.01, 0.05, 0.10, 0.15, 0.20, 0.25, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0 feet or meters, including any value there between. The length of the internally reinforced aerogels can be 1, 10, 100, 500, 1000, 1500, 2000, 2500, 3000, 3500, 4000, 4500, 5000, 5500, 6000, 6500, 7000, 7500, 8000, 8500, 9000, 9500, 10000 meters or feet and include any value there between. In certain aspects the length of the reinforced aerogel can be 1000 feet or meters, and 60 inches or 1.5 meters, respectively, in width. In a further embodiment the internally aerogel is 100 feet in length and 40 inches wide.

C. Articles of Manufacture

The organic polymer aerogels of the present invention can be included in an article of manufacture. For example, an article of manufacture can include an organic polymer matrix of a polymer selected from a polyamine, a polyamide, a polyimide, a poly(amide-imide), a poly(amic amide), a poly(ether imide), a polyphenol, a polyvinyl alcohol, a polyvinyl butyral, a polyurethane, a polyurea, a polyether, a polyester, a polyacid, a polycarbonate, resorcinol formaldehyde, or any combination thereof. In some embodiments, the article of manufacture is a thin film, monolith, wafer, blanket, core composite material, substrate for radiofrequency antenna, a sunscreen, a sunshield, a radome, insulating material for oil and/or gas pipeline, insulating material for liquefied natural gas pipeline, insulating material for cryogenic fluid transfer pipeline, insulating material for apparel, insulating material for aerospace applications, insulating material for buildings, cars, and other human habitats, insulating material for automotive applications, insulation for radiators, insulation for ducting and ventilation, insulation for air conditioning, insulation for heating and refrigeration and mobile air conditioning units, insulation for coolers, insulation for packaging, insulation for consumer goods, vibration dampening, wire and cable insulation, insulation for medical devices, support for catalysts, support for drugs, pharmaceuticals, and/or drug delivery systems, aqueous filtration apparatus, oil-based filtration apparatus, and solvent-based filtration apparatus.

In some embodiments, the aerogel is in the form of a blanket aerogel. Blanket aerogels are flexible, conformable aerogels that can be used to cover surfaces, including those having a complex geometry. Aerogel blankets made from aerogels described herein can be used in a variety of ways, including as insulation for piping or for other structures having irregular surfaces.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

A. Example 1—Polyimide Aerogels with Dispersed Microstructures

Polyimide aerogels were prepared in which aramid fibers, PTFE particles, or polyimide aerogel powders were dispersed. The aramid fibers used were Twaron fibers from Teijin Chemicals Company (Japan). Two different lengths of fibers were used: "short" fibers, which had a nominal length of 0.25 mm and a measured average length of 0.291 mm (n=87), and "long" fibers, which had a nominal length of 1.5 mm and a measured average length of 1.56 mm (n=8). The short fibers had a measured average diameter of 13.89 µm, and the long fibers had a measured average diameter of 14.86 µm.

The PTFE particles used were Ultraflor™ UF-8TA PTFE powder from Laurel Products. The UF-8TA PTFE particle has 400 nm spherical primary particles with hydrophilic macromolecules pinned to the surface.

The aerogel powder used was Aerozero® powder from Blueshift. The Aerozero® powder is a 100% polyimide powder made from polyimide aerogel material. The Aerozero® powder had particle sizes between 0.1 and 63 µm.

Each of the microstructures was dispersed into a 10 wt % polyamic acid solution containing 400 g of polyamic acid using a square bladed mixer at 350 rpm. Three different amounts of each of the microstructures were dispersed into the polyamic acid solution: 1 wt %, 0.5 wt %, and 0.25 wt % for the long aramid fibers, and 10 wt %, 5 wt %, and 2 wt % for the short aramid fibers, PTFE powder, and aerogel powder. The weight percentages for the microstructures were calculated relative to the mass of the polyamic acid in the solution. 31.8 g of 2-methylimidazole was then added followed by stirring at 350 rpm for 5 minutes, or until fully dissolved. 96.40 g of benzoic anhydride was then added, followed by stirring at 350 rpm for 3 minutes. 100 g of each gel precursor solution was then poured into 3-inch by 3-inch molds. The gels were cured at 75° C. for 20 minutes, and the gels were allowed to cool to room temperature, after which the gels were removed from the molds and submerged in acetone for three days, with acetone exchanges every 12 hours. The gels were then submerged in a TBA solution for three days, with TBA exchanges every 12 hours. The gels were then freeze-dried to create aerogels.

It was observed during these experiments that the PTFE powder is more uniformly dispersed in the polyamic acid solution when mixed with a Cowles blade at 900-1500 rpm for at least 12 hours before gelation.

B. Example 2 (Prophetic Example)—Mechanical Properties of Polymer Aerogels with Dispersed Polymeric Microstructures Organic polymer aerogels comprising polymeric microstructures will be produced by methods similar to those in Example 1. The thermal conductivity of the aerogels will be measured at a mean temperature of 20° C. and 13.8 kPa pressure using a heat flow meter. It is expected that the thermal conductivity measured in this way will be between about 15 and 40 mW/m·K.

The ultimate tensile strength (UTS) and modulus will be measured at 23° C. in the machine direction and in the cross direction according to American Standard Testing Method (ASTM) ASTM D5034 Standard Specification for Breaking Force and Elongation of Textile Fabrics (Grab Method). It is expected that the machine direction UTS will be between about 4.5 and 5.5 MPa, the machine direction modulus will be between 40 and 60 MPa, the cross direction UTS will be between 1.5 and 2.5 MPa, and the cross direction modulus will be between 25 and 45 MPa.

The compression strength will be measured according to the ASTM D1621-16 standard. It is expected that the compressive strength with 10% strain will be between about 0.05 MPa and 3.0 MPa. The flexural strength will be measured using the three-point bend test according to the ASTM D790 standard. It is expected that the flexural strength will be between about 0.05 MPa and 5 Gpa.

The specific surface area, pore volume, and average pore diameter of the aerogels will be measured by gas adsorption, and the pore volume, density, and porosity will be measured by mercury intrusion porosimetry. The specific surface area is expected to be between about 100 and 500 $m^2/g$. The pore volume as measured by gas adsorption is expected to be between about 0.2 and 1.3 $cm^3/g$. The average pore diameter is expected to be between about 8 and 25 nm. It is also expected that the pore size distribution will be at least bimodal, with one population of pores having an average diameter below 65 nm and another population of pores having an average diameter above 65 nm. The pore volume as measured by mercury intrusion porosimetry is expected to be between about 1.2 and 3.6 $cm^3/g$. The density is expected to be between about 0.15 $g/cm^3$ and 0.35 $g/cm^3$. and the porosity is expected to be between about 50 and 80%.

The Young's modulus, compressive strength, and flexural modulus of the aerogels will also be measured according to standard methods. The aerogels are expected to have a Young's modulus of at least 40 MPa in the machine direction, and a compressive strength of at least 0.5 MPa.

Organic polymer aerogels comprising polymeric microstructures will be produced by methods similar to those in Example 1, except that the drying step will be performed without freeze drying or supercritical drying but will instead involve evaporative air drying, either with or without the application of heat. Aerogel samples will also be prepared by vacuum drying, either with or without the application of heat. It is expected that the aerogels produced in this manner will have thermal and mechanical properties similar to those set forth above for aerogels dried by freeze drying.

C. Example 3—Preparation of Highly Branched Polyimide Resin

To prepare a highly branched polyimide resin, a reaction vessel with a mechanical stirrer and a water jacket was employed. The flow of the water through the reaction vessel jacket was adjusted to maintain temperature in the range of 20-28° C. The reaction vessel was charged with dimethylsulfoxide (DMSO) (108.2 lbs. 49.1 kg), and the mechanical stirrer speed was adjusted to 120-135 rpm. 1,3,5-tris(4-aminophenoxy) benzene (TAPOB, 65.03 g) was added to the solvent. To the solution was added 4,4'-diamino-2,2'-dimethylbiphenyl (DMB, 1,080.96 g), followed by 4,4'-oxydianiline (ODA, 1,018.73 g). A first portion of BPDA (1,524.71 g) was added. After stirring for 20 minutes, a sample of the reaction mixture was analyzed for viscosity. A second portion of BPDA (1,420.97 g) was added, and the reaction mixture was stirred for 20 additional minutes. A sample of the reaction mixture was analyzed for viscosity. A third portion of BPDA (42.81 g) was added, and the reaction mixture was stirred for 20 additional minutes. A sample of the reaction mixture was analyzed for viscosity. After stirring for 8 hours, phthalic anhydride (PA, 77.62 g) was added. The resulting reaction mixture was stirred until no more solid was visible. After 2 hours, the product was removed from the reaction vessel, filtered, and weighed.

Figure 3:
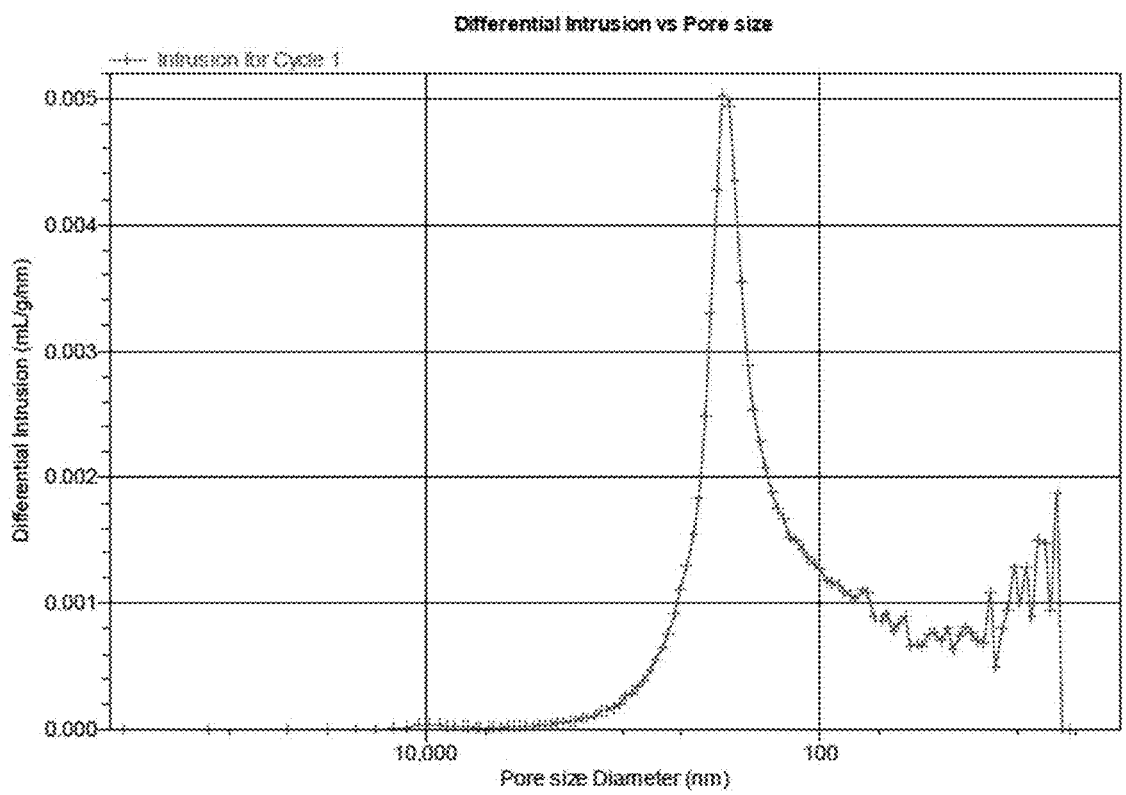
FIG. 3 shows a pore size distribution and a scanning electron microscope (SEM) image of a highly branched polyimide aerogel film with internal aramid fiber reinforcement prepared according to Example 4.
Figure 3:
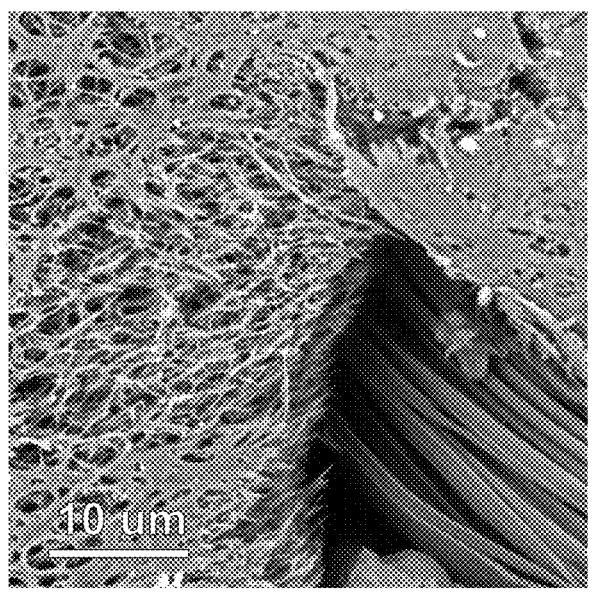

D. Example 4—Preparation of Highly Branched Polyimide Aerogel Film with Internal Aramid Reinforcement The resin (400 grams) prepared in Example 3 was mixed with 2-methylimidazole (28 grams) for three minutes. Benzoic anhydride (84 grams) was added, and the solution mixed an additional three minutes. After mixing, the resultant solution was poured onto an aramid scrim composed of fibers 20 μm in diameter supported by a stainless steel substrate and pulled through a draw-down coating bar. The aramid scrim impregnated with coating resin was left on a laboratory bench for 30 minutes, after which time the resin had gelled with the internal aramid scrim. The gelled film was collected and immersed in an acetone bath. After immersion for 60 seconds, it was transferred to a second acetone bath. The soak and transfer was repeated one additional time. After the final immersion, the gelled film was removed. The acetone solvent was evaporated under a stream of air at room temperature, and subsequently dried for 90 minutes at 200° C. under atmospheric conditions. The final recovered aerogel part had open-cell structure as observed by scanning electron microscopy (SEM) performed on a Phenom Pro Scanning Electron Microscope (Phenom-World, the Netherlands) and exhibited a density of 0.31 $g/cm^3$ and a porosity of 78.1% as measured according to ASTM D4404-10 with a Micromeritics® AutoPore V 9605 Automatic Mercury Penetrometer (Micromeritics® Instrument Corporation, U.S.A.). The distribution of pore sizes was measured according to ASTM D4404-10 using a Micromeritics® AutoPore V 9605 Automatic Mercury Penetrometer (Micromeritics® Instrument Corporation, U.S.A.), and the distribution of pore diameters is shown in FIG. 3. As shown in FIG. 3, the pore diameter distribution shows a multimodal distribution, with one mode of pores peaking at about 310 nm and another mode of pores peaking at about 6 nm. The overall average pore size was 349 nm.

Figure 4:
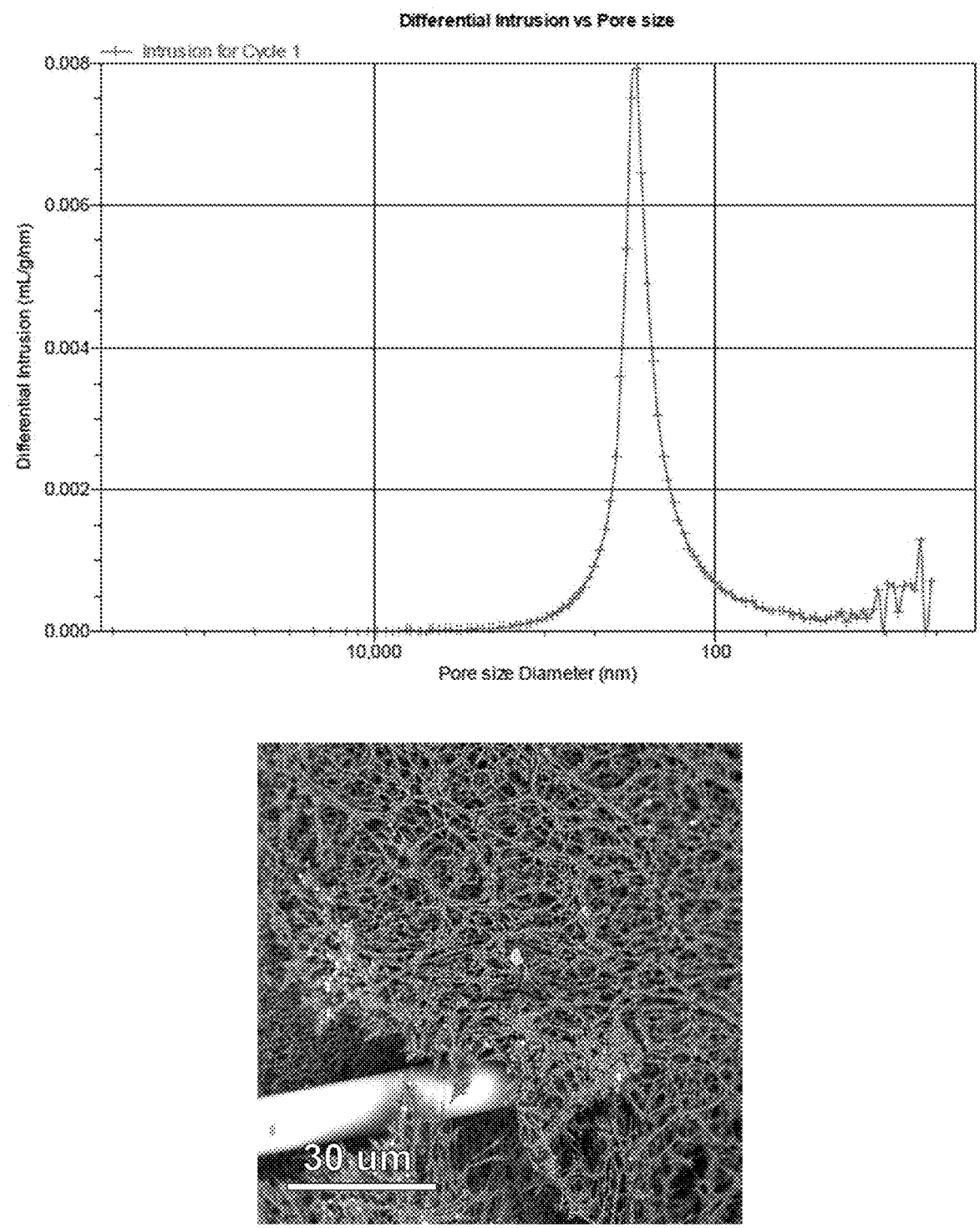
FIG. 4 shows a pore size distribution and an SEM image of a highly branched polyimide aerogel film with internal glass fiber reinforcement prepared according to Example 5.

E. Example 5—Preparation of Highly Branched Polyimide Aerogel Film with Internal Glass Reinforcement The process described in Example 4 was repeated exactly, but this time using a glass fiber scrim with glass fibers 12 μm in diameter. The final recovered aerogel part had open-cell structure as observed by scanning electron microscopy (SEM) performed on a Phenom Pro Scanning Electron Microscope (Phenom-World, the Netherlands), exhibited a density of 0.33 g/cm$^3$ and porosity of 72.7% as measured according to ASTM D4404-10 with a Micromeritics® AutoPore V 9605 Automatic Mercury Penetrometer (Micromeritics® Instrument Corporation, U.S.A.). The distribution of pore sizes was measured according to ASTM D4404-10 using a Micromeritics® AutoPore V 9605 Automatic Mercury Penetrometer (Micromeritics® Instrument Corporation, U.S.A.), and the distribution of pore diameters is shown in FIG. 4. As shown in FIG. 4, the pore diameter distribution shows a multimodal distribution, with one mode of pores peaking at about 289 nm and another mode of pores peaking at about 6 nm. The overall average pore size was 361 nm.

Figure 5:
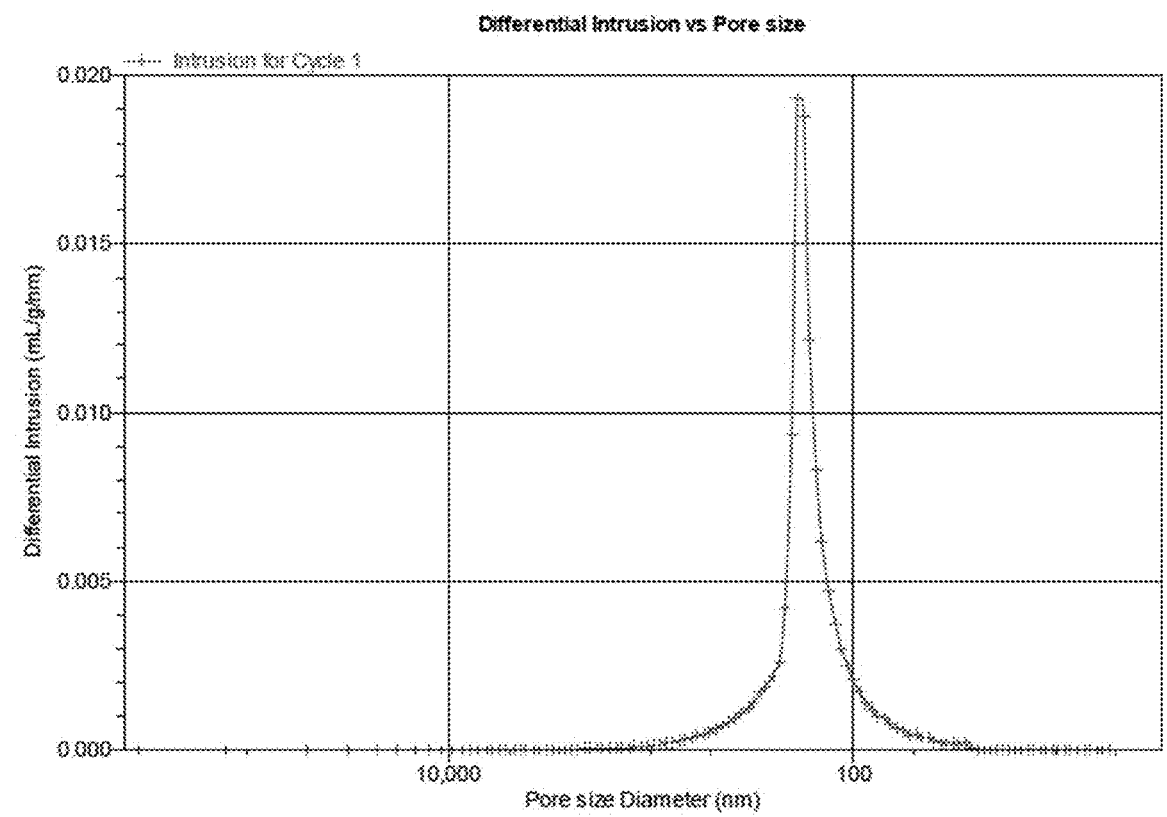
FIG. 5 shows a pore size distribution and an SEM image of a highly branched polyimide aerogel film with no internal reinforcement prepared according to Comparative Example 6.
Figure 5:
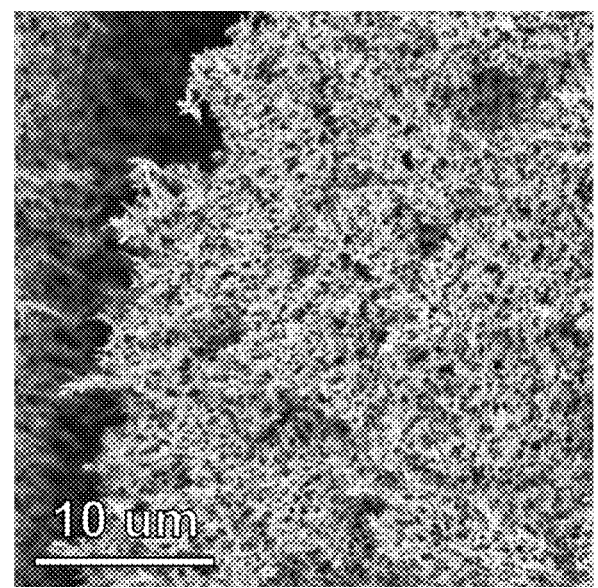

F. Example 6 (Comparative Example)—Preparation of Highly Branched Polyimide Aerogel with No Internal Reinforcement The process described in Example 2 was repeated exactly, but this time without using any reinforcement fiber. The final recovered aerogel part had open-cell structure as observed by scanning electron microscopy (SEM) performed on a Phenom Pro Scanning Electron Microscope (Phenom-World, the Netherlands), exhibited a density of 0.34 g/cm$^3$ and porosity of 75.4% as measured according to ASTM D4404-10 with a Micromeritics® AutoPore V 9605 Automatic Mercury Penetrometer (Micromeritics® Instrument Corporation, U.S.A.). The distribution of pore sizes was measured according to ASTM D4404-10 using a Micromeritics® AutoPore V 9605 Automatic Mercury Penetrometer (Micromeritics® Instrument Corporation, U.S.A.), and the distribution of pore diameters is shown in FIG. 5. As shown in FIG. 5, the pore diameter distribution shows a single mode peaking at about 188 nm, with an overall average pore size of 237 nm.

G. Example 7—Preparation of a Highly Branched BPDA/DMB-ODA Polyimide Resin

A reaction vessel with a mechanical stirrer and a water jacket was used. The flow of the water through the reaction vessel jacket was adjusted to maintain temperature in the range of 20-28° C. The reaction vessel was charged with dimethylsulfoxide (DMSO) (108.2 lbs. 49.1 kg), and the mechanical stirrer speed was adjusted to 120-135 rpm. 1,3,5-Tris(4-aminophenoxy) benzene (TAPOB, 65.93 g) was added to the solvent. To the solution was added 4,4'-diamino-2,2'-dimethylbiphenyl (DMB, 1081.6 g), followed by 4'4-oxydianiline (ODA, 1020.2 g). A first portion of 4,4'-Biphthalic dianhydride (BPDA, 1438.4 g) was then added. After stirring for 20 minutes, a sample of the reaction mixture was analyzed for viscosity using a Brookfield DV1 viscometer (Brookfield, AMETEK, U.S.A.). A second portion of BPDA (1407.8 g) was added, and the reaction mixture was stirred for 20 additional minutes. A third portion of BPDA (74.35 g) was added, and the reaction mixture was stirred for 20 minutes. A sample of the reaction mixture was analyzed for viscosity. After stirring for 8 hours, phthalic anhydride (PA, 17.4 g) was added. The resulting reaction mixture was stirred until no more solids were visible. After 2 hours, the product was removed from the reaction vessel, filtered, and weighed.

H. Example 8—Preparation of a Highly Branched Polyimide Aerogel Monolith with Dispersed Polyester Microstructures Polyimide aerogels were prepared in which polyester fibers were dispersed. The polyester fibers used were from Barnet Europe (Germany). The fiber length had a nominal length of 0.50 mm and a measured average length of 0.48 mm (n=29). The fibers had a measured average diameter of 5.9 μm (n=35).

The resin (about 400 grams) prepared in Example 7 was mixed with the polyester fibers (about 4 grams) using a Cowles blade at 900 rpm for 20 hours. About 28 g of 2-methylimidazole was then added followed by stirring with a square-bladed mixer at 300 rpm for 5 minutes. About 84 g of benzoic anhydride was then added, followed by stirring at 300 rpm for 3 minutes. About 230 g of this solution was then poured into 3-inch by 3-inch molds and left for 24 hours. The gelled shape was removed from the mold and placed into an acetone bath. After immersion for 24 hours, the acetone bath was exchanged with fresh acetone. The soak and exchange process was repeated five times. After the final exchange, the part was dried with an ambient (about 20 to 30° C.) drying process to evaporate a majority of the acetone over 48 hours followed by thermal drying 100° C. under atmospheric conditions for 10 hours.

Figure 6:
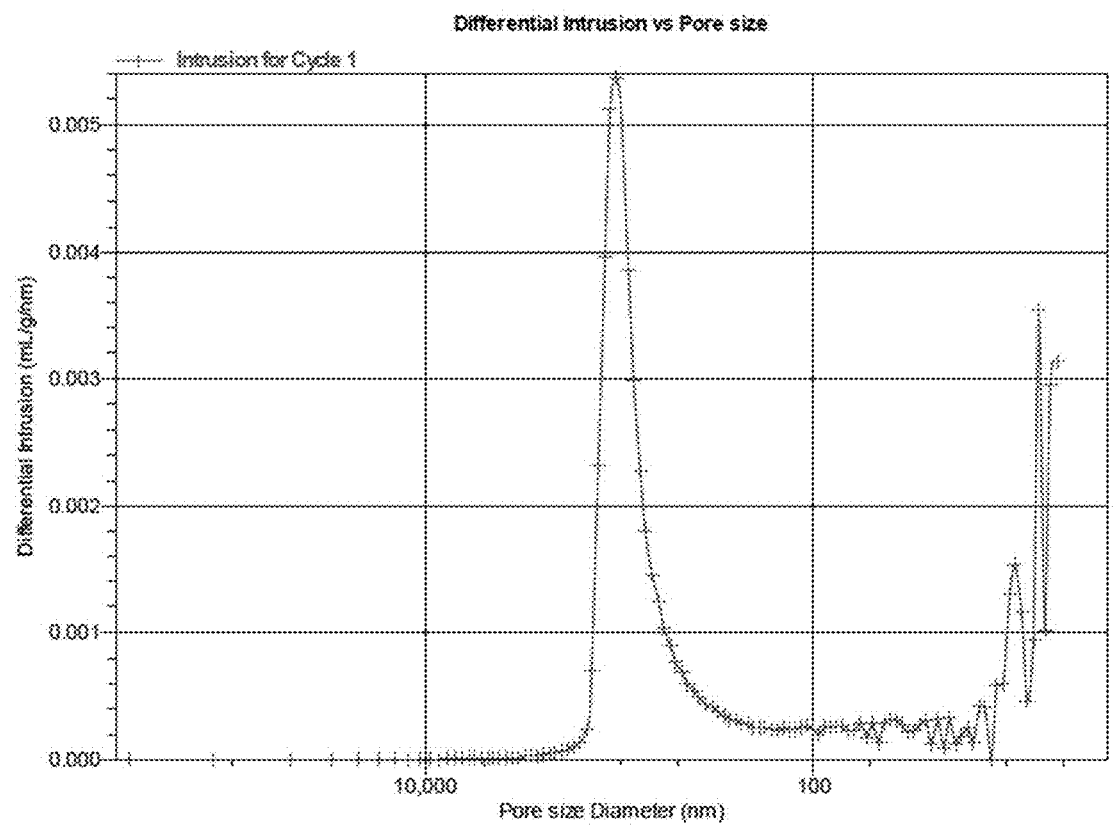
FIG. 6 shows a pore size distribution and an SEM image of a highly branched polyimide aerogel monolith with dispersed polyester microstructures prepared according to Example 8.
Figure 6:
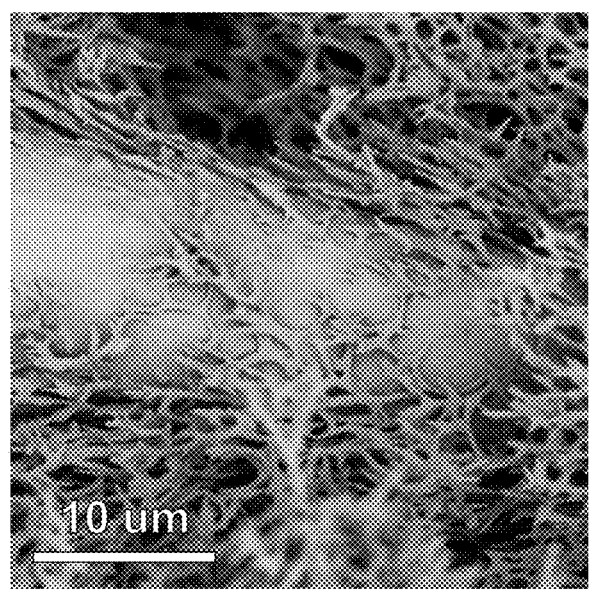

The final recovered aerogel part had open-cell structure as observed by scanning electron microscopy (SEM) performed on a Phenom Pro Scanning Electron Microscope (Phenom-World, the Netherlands), exhibited a density of 0.20 g/cm$^3$ and porosity of 80.5% as measured according to ASTM D4404-10 with a Micromeritics® AutoPore V 9605 Automatic Mercury Penetrometer (Micromeritics® Instrument Corporation, U.S.A.), a compression modulus of 45.2 MPa as determined by American Standard Testing Method (ASTM) D395-16, and a compression strength at 10% strain of 1.04 MPa as determined by ASTM D395-16. The distribution of pore sizes was measured according to ASTM D4404-10 using a Micromeritics® AutoPore V 9605 Automatic Mercury Penetrometer (Micromeritics® Instrument Corporation, U.S.A.), and the distribution of pore diameters is provided in FIG. 6. As shown in FIG. 6, the pore diameter distribution shows a multimodal distribution, with one mode of pores peaking at about 1040 nm and another mode of pores peaking at about 7 nm. The overall average pore size was 631 nm.

I. Example 9 (Comparative Example)—Preparation of a Highly Branched Polyimide Aerogel Monolith without Dispersed Polyester Microstructures The resin (about 400 grams) prepared in Example 7 was mixed with about 28 g of 2-methylimidazole followed by stirring with a square-bladed mixer at 300 rpm for 5 minutes. About 84 g of benzoic anhydride was then added, followed by stirring at 300 rpm for 3 minutes. 230 g of this solution was then poured into a 3-inch by 3-inch molds and left for 24 hours. The gelled shape was removed from the mold and placed into an acetone bath and processed as the shape in Example 8.

Figure 7:
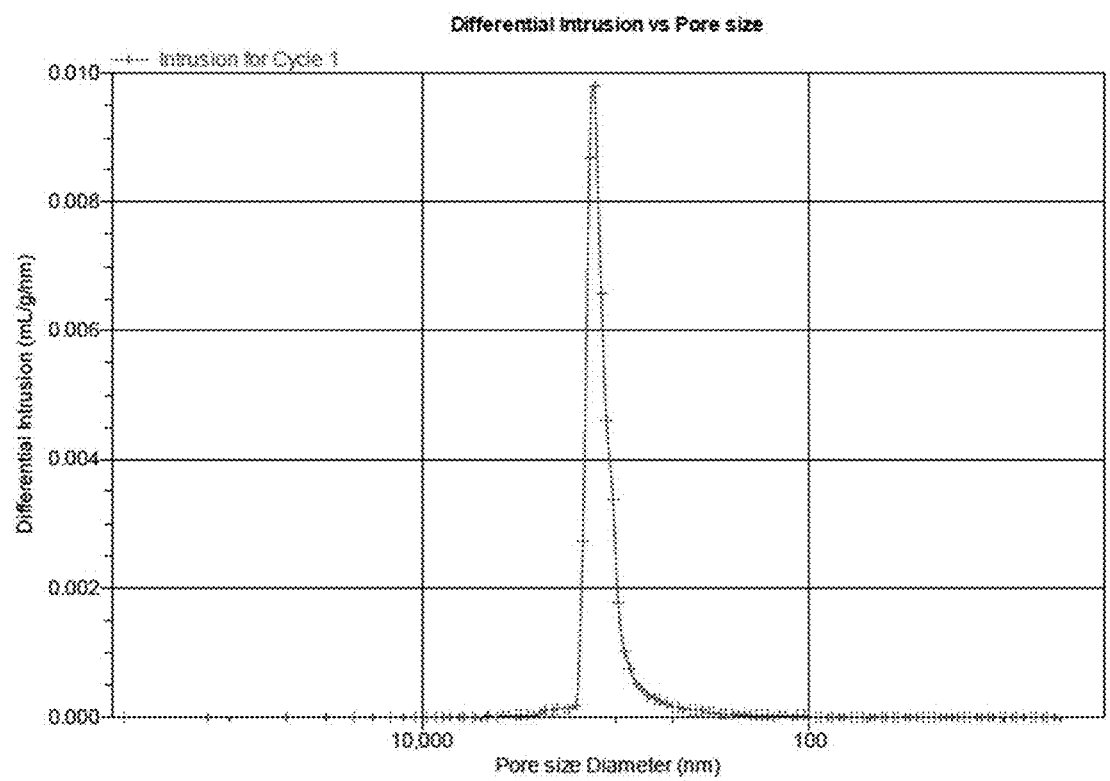
FIG. 7 shows a pore size distribution and an SEM image of a highly branched polyimide aerogel film without dispersed polyester microstructures prepared according to Comparative Example 9.
Figure 7:
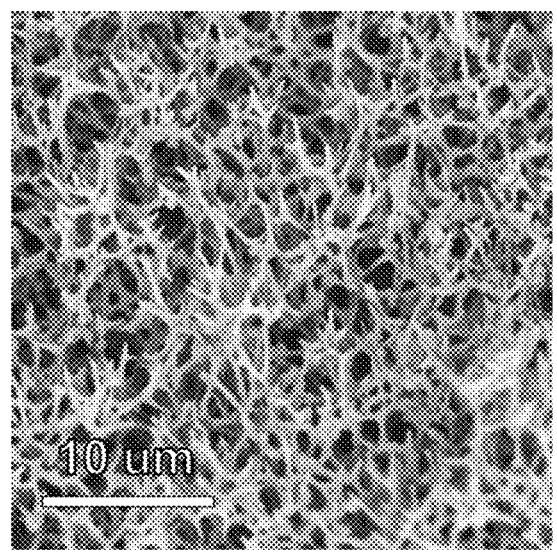

The final recovered aerogel part had open-cell structure as observed by scanning electron microscopy (SEM) performed on a Phenom Pro Scanning Electron Microscope (Phenom-World, the Netherlands), exhibited a density of 0.22 g/cm$^3$ and porosity of 88.5% as measured according to ASTM D4404-10 with a Micromeritics® AutoPore V 9605 Automatic Mercury Penetrometer (Micromeritics® Instrument Corporation, U.S.A.), a compression modulus of 14.3 MPa as determined by American Standard Testing Method (ASTM) D395-16, and a compression strength at 10% strain of 0.49 MPa as determined by ASTM D395-16. The distribution of pore sizes was measured according to ASTM D4404-10 using a Micromeritics® AutoPore V 9605 Automatic Mercury Penetrometer (Micromeritics® Instrument Corporation, U.S.A.), and the distribution of pore diameters is provided in FIG. 7. As shown in FIG. 7, the pore diameter distribution shows a single mode at 1285 nm. The overall average pore size was 1288 nm.

J. Example 10—Preparation of a Highly Branched PMDA/DMB-ODA Polyimide Resin

A reaction vessel as described in Example 7 was charged with 2.858 kg DMSO. To the vessel was added 4,4'-ODA (about 25.74 g), DMB (about 27.29 g), and TAPOB (about 3.18 g) and stirred for about 20 minutes. To the solution was added PMDA (about 52.81 g), and the solution was stirred for about 20 minutes. These additions of amines (ODA, DMB, and TAPOB) and PMDA were repeated two additional times. After stirring for about 16 hours, PA (29.88 g) was added. The resulting reaction mixture was stirred until no more solid was visible. After about 2 hours, the product was removed from the reaction vessel, filtered, and weighed.

K. Example 11—Preparation of a Highly Branched Polyimide Aerogel Monolith with Dispersed Long Aramid Fiber Microstructures Polyimide aerogels were prepared in which aramid fibers were dispersed. The long aramid fibers used were Twaron fibers from Teijin Chemicals Company (Japan). The fibers had a nominal length of 1.5 mm and a measured average length of 1.56 mm (n=8). The fibers had a measured average diameter of 14.86 μm The resin (about 400 grams) prepared in Example 10 was mixed with the aramid fibers (about 0.4 gram; 1 wt %) using a square bladed mixer at 350 rpm for 30 minutes. 31.8 g of 2-methylimidazole was then added followed by stirring at 350 rpm for 5 minutes. 96.4 g of benzoic anhydride was then added, followed by stirring at 350 rpm for 5 minutes. 100 g of this solution was then poured into a 3-inch by 3-inch molds and placed in an oven at at 75° C. for 30 minutes and then left overnight at room temperature.

Figure 8:
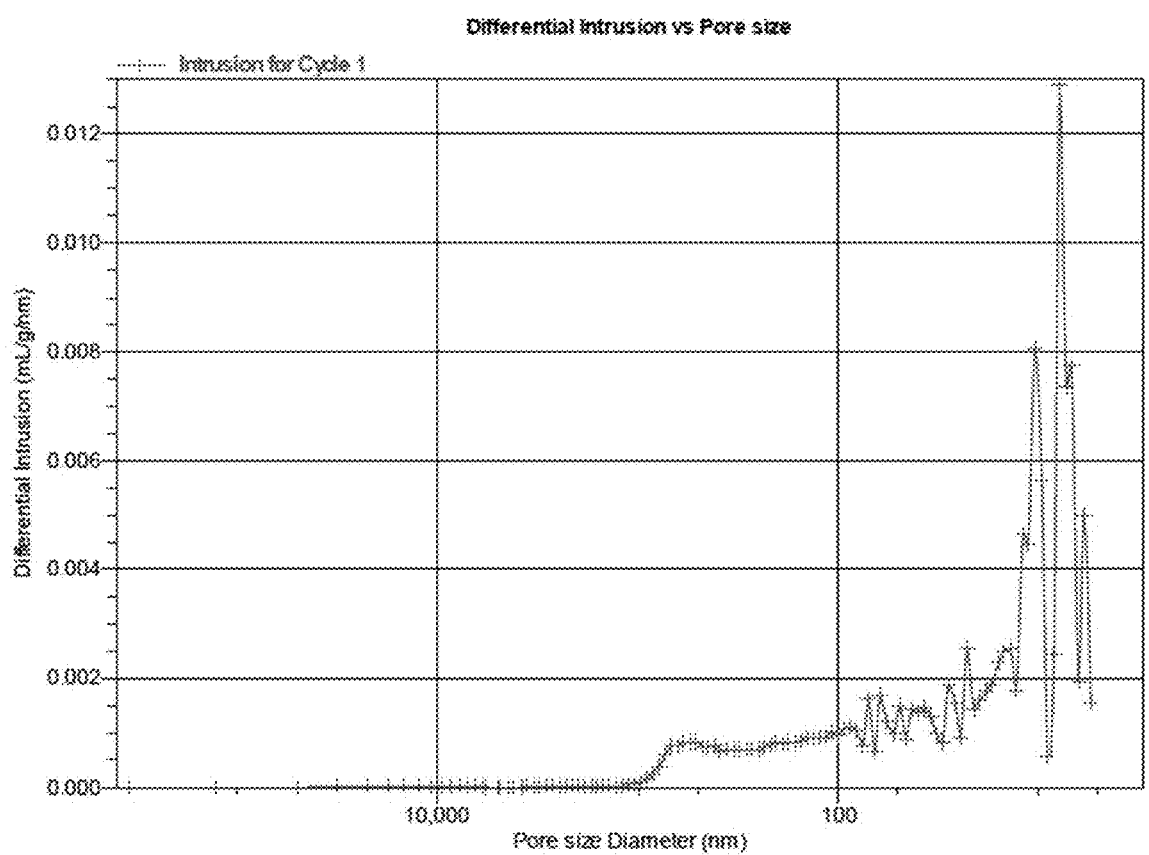
FIG. 8 shows a pore size distribution of a highly branched polyimide aerogel monolith with dispersed long aramid fiber microstructures prepared according to Example 11.

The gelled shape was removed from the mold, and placed into an acetone bath. After immersion for 24 hours, the acetone bath was exchanged with fresh acetone. The soak and exchange process was repeated five times. After the final exchange, the bath was replaced with tertiary butyl alcohol. After immersion for 24 hours, the tertiary butyl alcohol bath was exchanged for fresh tertiary butyl alcohol. The soak and exchange process was repeated three times. The part was subsequently frozen on a shelf freezer, and subjected to subcritical drying for 96 hours in at 5° C., followed by drying in vacuum at 50° C. for 48 hours. The final recovered aerogel exhibited a density of 0.25 g/cm$^3$ and porosity of 82.3% as measured according to ASTM D4404-10 with a Micromeritics® AutoPore V 9605 Automatic Mercury Penetrometer (Micromeritics® Instrument Corporation, U.S.A.). The distribution of pore sizes was measured according to ASTM D4404-10 using a Micromeritics® AutoPore V 9605 Automatic Mercury Penetrometer (Micromeritics® Instrument Corporation, U.S.A.), and the distribution of pore diameters is shown in FIG. 8. As shown in FIG. 8, the pore diameter distribution shows a multimodal distribution with one mode of pores peaking at about 357 nm and another mode of pores peaking at about 8 nm. The overall average pore size was 360 nm.

L. Example 12—Preparation of a Highly Branched Polyimide Aerogel Monolith with Dispersed Short Aramid Fiber Microstructures Polyimide aerogels were prepared in which polyester fibers were dispersed. The short aramid fibers used were Twaron fibers from Teijin Chemicals Company (Japan). The fibers had a nominal length of 0.25 mm and a measured average length of 0.29 mm (n=87). The fibers had a measured average diameter of 13.89 μm.

The resin (about 400 grams) prepared in Example 10 was mixed with the aramid fibers (about 2.0 gram; 5 wt %) using a square bladed mixer at 350 rpm for 30 minutes. 31.8 g of 2-methylimidazole was then added followed by stirring at 350 rpm for 5 minutes. 96.4 g of benzoic anhydride was then added, followed by stirring at 350 rpm for 5 minutes. 100 g of this solution was then poured into a 3-inch by 3-inch molds and placed in an oven at at 75° C. for 30 minutes and then left overnight at room temperature.

Figure 9:
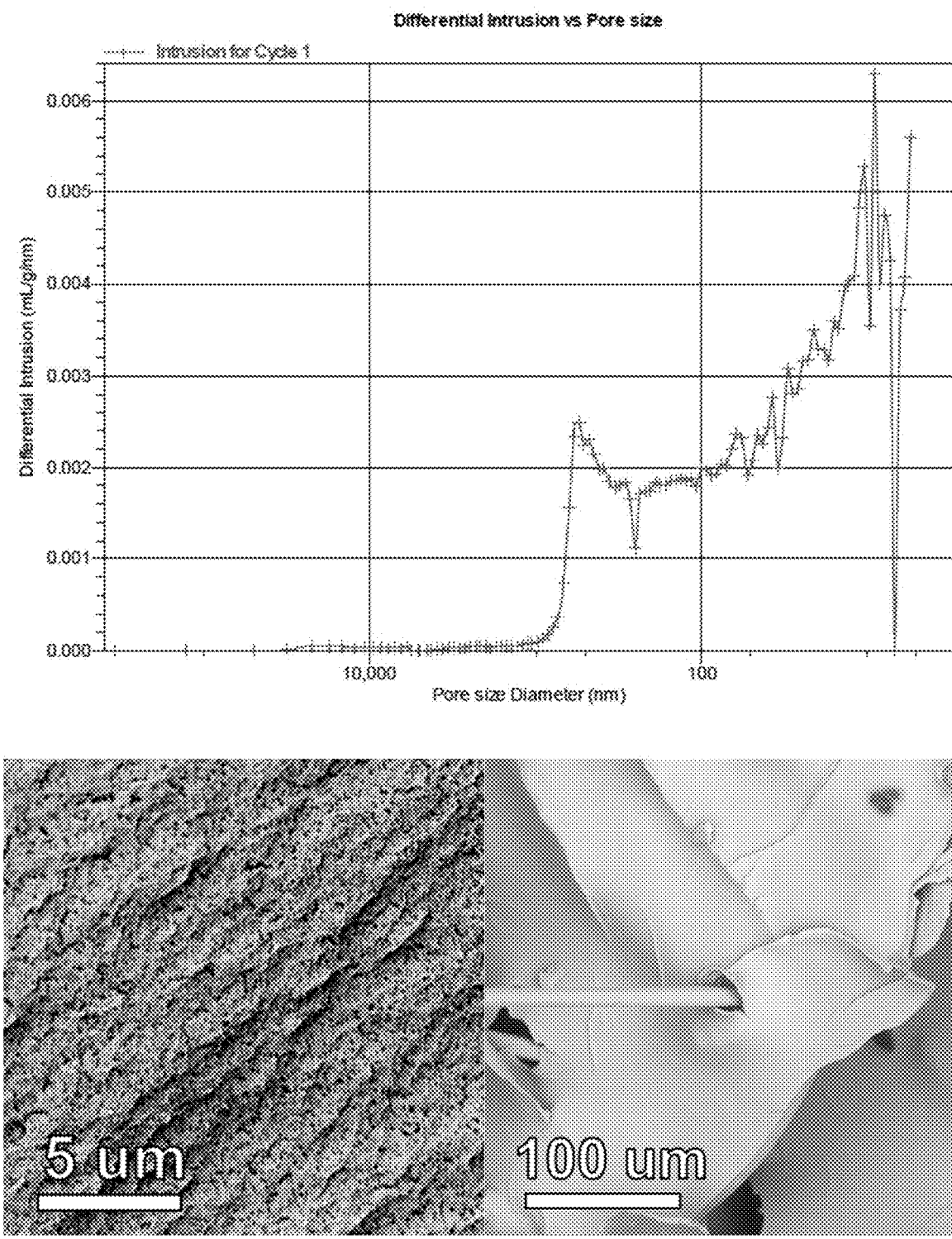
FIG. 9 shows a pore size distribution and an SEM image of a highly branched polyimide aerogel monolith with dispersed short aramid fiber microstructures prepared according to Example 12.

The gelled shape was removed from the mold, and placed into an acetone bath. After immersion for 24 hours, the acetone bath was exchanged with fresh acetone. The soak and exchange process was repeated five times. After the final exchange, the bath was replaced with tertiary butyl alcohol. After immersion for 24 hours, the tertiary butyl alcohol bath was exchanged for fresh tertiary butyl alcohol. The soak and exchange process was repeated three times The part was subsequently frozen on a shelf freezer, and subjected to subcritical drying for 96 hours in at 5° C., followed by drying in vacuum at 50° C. for 48 hours. The final recovered aerogel part had open-cell structure as observed by scanning electron microscopy (SEM) performed on a Phenom Pro Scanning Electron Microscope (Phenom-World, the Netherlands), exhibited a density of 0.26 g/cm$^3$ and porosity of 75.9% as measured according to ASTM D4404-10 with a Micromeritics® AutoPore V 9605 Automatic Mercury Penetrometer (Micromeritics® Instrument Corporation, U.S.A.). The distribution of pore sizes was measured according to ASTM D4404-10 using a Micromeritics® AutoPore V 9605 Automatic Mercury Penetrometer (Micromeritics® Instrument Corporation, U.S.A.), and the distribution of pore diameters is shown in FIG. 9. As shown in FIG. 9, the pore diameter distribution shows a multimodal distribution with one mode of pores peaking at about 548 nm and another mode of pores peaking at about 9 nm. The overall average pore size was 223 nm.

M. Example 13 (Comparative Example)—Preparation of a Highly Branched Polyimide Aerogel Monolith with No Microstructures A resin synthesized as in Example 10 was used, with the following changes in solvent and monomer amounts: 2.686 kg DMSO, 39.64 g DMB, 37.39 g ODA, 80.95 g PMDA, 21.88 g PA. This resin (about 400 grams) was mixed with 48.75 g of 2-methylimidazole and stirred at 350 rpm for 5 minutes. 147.76 g of benzoic anhydride was then added, followed by stirring at 350 rpm for 5 minutes. 100 g of this solution was then poured into a 3-inch by 3-inch molds and placed in an oven at at 75° C. for 30 minutes and then left overnight at room temperature. The gelled shape was removed from the mold and placed into an acetone bath and processed as the shape in Example 11.

Figure 10:
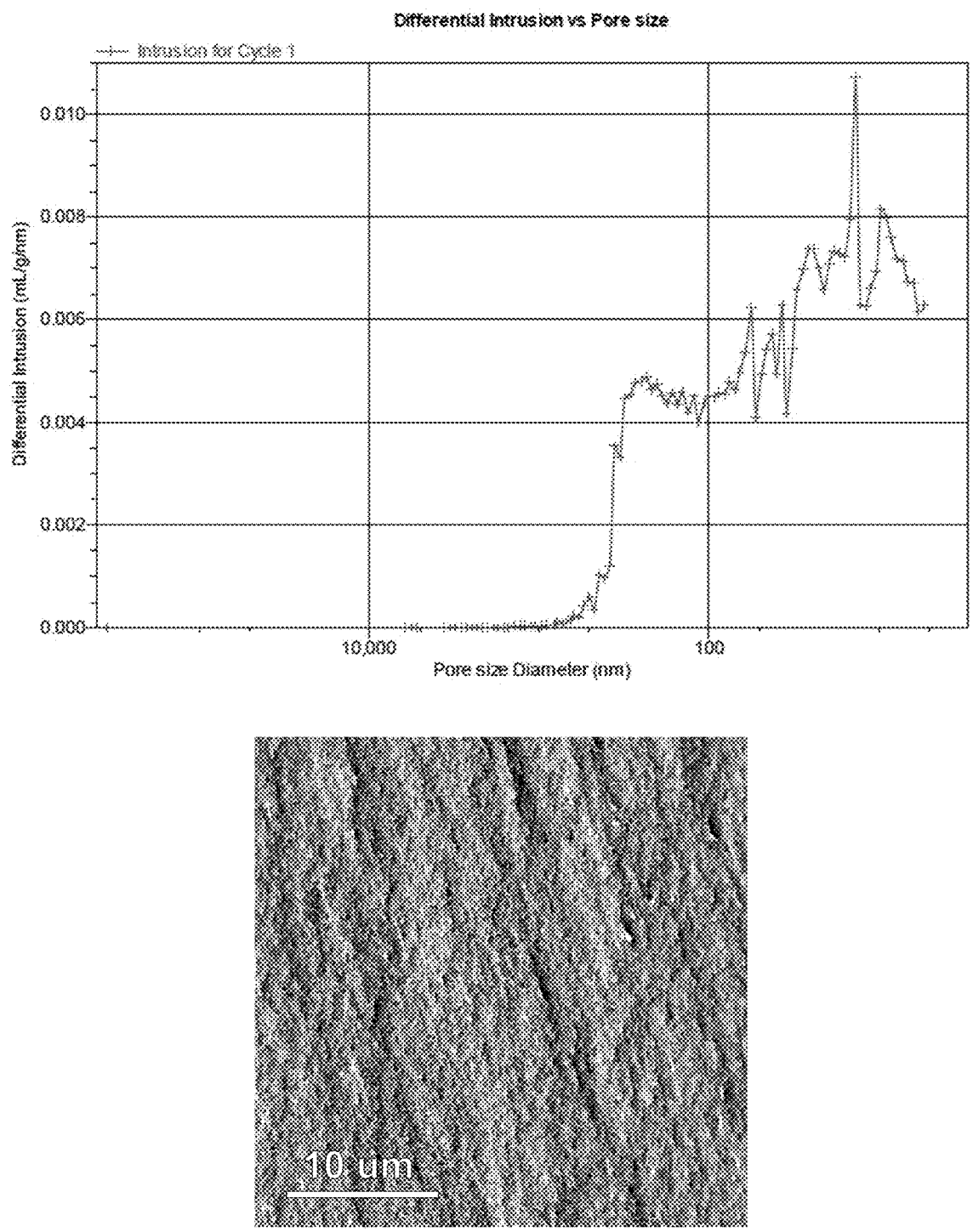
FIG. 10 shows a pore size distribution and an SEM image of a highly branched polyimide aerogel monolith no dispersed microstructures prepared according to Comparative Example 13.

The final recovered aerogel part had open-cell structure as observed by scanning electron microscopy (SEM) performed on a Phenom Pro Scanning Electron Microscope (Phenom-World, the Netherlands), exhibited a density of 0.17 g/cm³ and porosity of 86.9% as measured according to ASTM D4404-10 with a Micromeritics® AutoPore V 9605 Automatic Mercury Penetrometer (Micromeritics® Instrument Corporation, U.S.A.). The distribution of pore sizes was measured according to ASTM D4404-10 using a Micromeritics® AutoPore V 9605 Automatic Mercury Penetrometer (Micromeritics® Instrument Corporation, U.S.A.), and the distribution of pore diameters is shown in FIG. 10. The distribution shows two modes, with one mode of pores peaking at about 233 nm and another mode of pores peaking at about 14 nm, which is a smaller distribution window seen for monoliths containing microstructures. The overall average pore size was 132 nm.

The invention claimed is:

1. An open-celled polymeric material comprising an organic polymer gel matrix and microstructures dispersed or embedded within the organic polymer gel matrix, wherein the organic polymer gel matrix has an at least bimodal pore size distribution comprising a first peak of less than or equal to 65 nm and a second peak greater than or equal to 100 nm.

2. The open-celled organic polymer material of claim 1, wherein the material has a thermal conductivity of less than or equal to 40 mW/m·K at a temperature of 20° C.

3. The open-celled organic polymer material of claim 2, wherein the material has a thermal conductivity of 10 to 40 mW/m K at a temperature of 20° C.

4. The open-celled organic polymer material of claim 1, wherein the material has a thickness of 1 millimeter (mm) or less.

5. The open-celled organic polymer material of claim 4, wherein the material has a thickness of 0.125 mm to 1 mm.

6. The open-celled organic polymer material of claim 1, wherein the material has a thickness of 1 millimeter (mm) or more.

7. The open-celled organic polymer material of claim 6, wherein the material has a thickness of 1 mm to 50 mm.

8. The open-celled organic polymer material of claim 1, wherein the first peak is 1 nm to 15 nm.

9. The open-celled organic polymer material of claim 1, wherein the second peak is 100 nm to 500 nm.

10. The open-celled organic polymer material of claim 1, wherein the microstructures comprise carbon particles.

11. The open-celled organic polymer material of claim 1, wherein the microstructures comprise inorganic microstructures.

12. The open-celled organic polymer material of claim 11, wherein the inorganic microstructures comprise glass fibers.

13. The open-celled organic polymer material of claim 1, wherein the microstructures are polymeric microstructures.

14. The open-celled organic polymer material of claim 13, wherein the polymeric microstructures comprise one or more of aramid fibers, polyester fibers, poly (tetrafluoroethylene) (PTFE) particles, or aerogel powder particles.

15. The open-celled organic polymer material of claim 1, wherein the microstructures comprise 1 wt. % to 50 wt. % of the material.

16. The open-celled organic polymer material of claim 1, wherein the organic polymer gel matrix comprises resorcinol formaldehyde, phenol formaldehyde, polyimide, polyamine, polyamide, poly (amide-imide), poly (amic amide), poly (ether imide), polyphenol, polyalcohol, polyvinyl butyral, polyurethane, polyurea, polycarbonate, polyester, polyether, or polyacid, or any combination thereof.

17. The open-celled organic polymer material of claim 16, wherein the organic polymer gel matrix comprises polyimide.

18. The open-celled organic polymer material of claim 1, wherein the material has a density of 0.1 g/cm³ to 0.5 g/cm³, a pore volume of greater than 2 cm³/g, and a surface area of at least 150 m²/g.

19. The open-celled organic polymer material of claim 1, wherein the material has a tensile strength of at least 2 MPa and a compression strength at 10% strain of at least 1.0 MPa.

20. The open-celled organic polymer material of claim 1, comprised in an article of manufacture.

21. The open-celled organic polymer material of claim 20, wherein the article of manufacture is an insulative material for an automotive application.

22. The open-celled organic polymer material of claim 20, wherein the article of manufacture is an insulative material for a wire or a cable.

23. The open-celled organic polymer material of claim 20, wherein the article of manufacture is an insulative material for an aerospace application.

* * * * *